(12) United States Patent
Suzuki et al.

(10) Patent No.: US 9,000,111 B2
(45) Date of Patent: Apr. 7, 2015

(54) THERMOPLASTIC RESIN, ORGANIC-INORGANIC HYBRID COMPOSITION AND OPTICAL PARTS

(75) Inventors: Ryo Suzuki, Kanagawa (JP); Rie Okutsu, Kanagawa (JP); Hiroaki Mochizuki, Kanagawa (JP); Tatsuhiko Obayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 586 days.

(21) Appl. No.: 12/737,800

(22) PCT Filed: Aug. 28, 2009

(86) PCT No.: PCT/JP2009/065458
§ 371 (c)(1),
(2), (4) Date: Feb. 17, 2011

(87) PCT Pub. No.: WO2010/024463
PCT Pub. Date: Mar. 4, 2010

(65) Prior Publication Data
US 2011/0135903 A1    Jun. 9, 2011

(30) Foreign Application Priority Data

Aug. 28, 2008 (JP) ................. 2008-219952
Sep. 8, 2008 (JP) ................. 2008-229629

(51) Int. Cl.
| | | |
|---|---|---|
| C08F 28/06 | (2006.01) | |
| C08F 20/38 | (2006.01) | |
| C08F 26/06 | (2006.01) | |
| C08F 28/02 | (2006.01) | |
| G02B 1/04 | (2006.01) | |

(52) U.S. Cl.
CPC .............. *C08F 20/38* (2013.01); *C08F 26/06* (2013.01); *C08F 28/02* (2013.01); *G02B 1/041* (2013.01)

(58) Field of Classification Search
USPC ........................................... 526/257
See application file for complete search history.

(56) References Cited

U.S. PATENT DOCUMENTS 6,068,963 A * 5/2000 Aoshima .............. 430/270.1

FOREIGN PATENT DOCUMENTS

| | | | |
|---|---|---|---|
| JP | 02-029401 | | 1/1990 |
| JP | 02265907 | A * | 10/1990 |
| JP | H02-265907 | A | 10/1990 |
| JP | 04-225007 | | 8/1992 |
| JP | 04-296307 | | 10/1992 |
| JP | 10-239794 | A | 9/1998 |
| JP | 10-298287 | | 11/1998 |
| JP | 2000-087027 | | 3/2000 |
| JP | 2002-131502 | | 5/2002 |
| JP | 2003-073559 | | 3/2003 |
| JP | 2003-073563 | | 3/2003 |
| JP | 2003-073564 | | 3/2003 |
| JP | 2003-147090 | | 5/2003 |
| JP | 2004-217714 | | 8/2004 |
| JP | 2004-524396 | | 8/2004 |
| JP | 2004-244444 | | 9/2004 |
| JP | 2004-352975 | | 12/2004 |
| JP | 2007-238929 | | 9/2007 |
| WO | WO 02/058928 | A1 | 8/2002 |

OTHER PUBLICATIONS

EPO English abstract of JP 02265907 A.*
Office Action issued by JPO on Jul. 23, 2013, in connection with corresponding Japanese Patent Application No. 2008-229629.

* cited by examiner

*Primary Examiner* — Wenwen Cai
(74) *Attorney, Agent, or Firm* — Jean C. Edwards, Esq.; Edwards Neils PLLC

(57) ABSTRACT

An optical part comprising a thermoplastic resin having a recurring unit represented by the following formula (1):

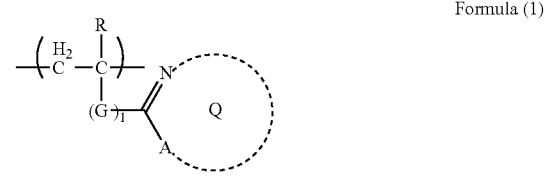

Formula (1)

wherein R represents a hydrogen atom, an alkyl group, or an aryl group; G represents a divalent linking group; A represents an oxygen atom, a sulfur atom, or —N($R^1$)—; $R^1$ represents a hydrogen atom, an alkyl group, or an aryl group; Q represents an atomic group of forming a hetero ring; and l indicates 0 or 1.

8 Claims, No Drawings

THERMOPLASTIC RESIN, ORGANIC-INORGANIC HYBRID COMPOSITION AND OPTICAL PARTS

CROSS-REFERENCE TO RELATED APPLICATIONS

The present invention is a 35 U.S.C. 371 National Stage Entry of PCT/JP2009/065458, filed Aug. 28, 2009, which claims priority from Japanese Patent Application No. 2008-219952, filed on Aug. 28, 2008; and Japanese Patent Application No. 2008-229629, filed on Sep. 8, 2008, the contents of which are all herein incorporated by reference.

TECHNICAL FIELD

The present invention relates to a thermoplastic resin having high refractivity and excellent in transparency, workability, heat resistance and coloring resistance, to an organic-inorganic hybrid composition excellent in high refractivity, transparency, lightweightness and workability, and also to optical parts such as lens substrates comprising them (e.g., lenses for spectacles, lenses for optical instruments, lenses for optoelectronics, laser lenses, pickup lenses, in-vehicle camera lenses, mobile camera lenses, digital camera lenses, OHP lenses), etc.

BACKGROUND ART

Recently, studies of optical materials are being made actively, and in particular, in the field of lens materials, it is much desired to develop materials excellent in high refractivity, low dispersion (high Abbe's number), heat resistance, transparency, easy shapability, lightweightness, chemical resistance, solvent resistance, etc.

As compared with inorganic materials such as glass, plastic lenses are lightweight and hardly crack, and can be shaped into various forms; and therefore, not only for spectacles but also recently for other optical materials such as mobile camera lenses or pickup lenses, plastic lenses are rapidly growing popular. Regarding the starting material for producing high-refractivity plastic lenses, polycarbonate is known as one typical example for them. Recently, however, it is desired to further increase the refractivity of the lenses for thinning them; however, polycarbonate could not fully satisfy the requirement.

Accordingly, it has become desired to develop a resin material more excellent than polycarbonate and to increase the refractivity of the material itself for producing thin lenses. For example, a technique of introducing a sulfur atom into a polymer (e.g., JP-A 2002-131502, 10-298287), and a technique of introducing a halogen atom or an aromatic ring into a polymer (e.g., JP-A 2004-244444) have been studied actively. In addition, a technique of using a resin with a 2-mercaptobenzothiazole structure or a 2-mercaptobenzoxazole structure introduced into the side chain of a polymer via a phenylene group has been developed (JP-A 2-29401).

On the other hand, it is known that, when a resin with a 2-benzothiazole group or a 2-benzoxazole group directly bonding to the main-chain structure of a polymer is used as an organic EL device material, then the device enables bright emission and has good durability (JP-A 2000-87027). However, the patent reference says nothing relating to the refractivity and the coloring resistance of the resin, and the usefulness of the material for optical parts is still unknown.

Although the above proposals have been made to attain higher refractivity of resins, a plastic material having high refractivity and good transparency and capable of being a substitute for glass has not as yet been developed. For optical fibers or optical waveguides, materials differing in refractivity may be combined or a material having refractivity distribution may be used. For these, therefore, it is desired to develop a technique of controlling the refractivity of plastics in any desired manner.

It is difficult to increase the refractivity of organic substances alone; and therefore, a method for producing a high-refractivity material is reported, which comprises dispersing a high-refractivity inorganic substance in a resin matrix (e.g., JP-A 2003-73559). For retarding the transmitted light attenuation owing to Rayleigh scattering, it is desirable to uniformly disperse inorganic fine particles having a particle size of at most 15 nm in a resin matrix. However, primary particles having a particle size of at most 15 nm tend to aggregate extremely easily, and therefore it is extremely difficult to uniformly disperse the particles in a resin material. In addition, in consideration of the transmitted light attenuation in the optical path length corresponding to the thickness of a lens, the amount of the inorganic fine particles to be added must be limited. Accordingly, it has heretofore been impossible to disperse fine particles in a resin matrix at a high concentration, not lowering the transparency of the resin.

Further reported are a shaped article of a resin composition, which comprises mainly a thermoplastic resin composition with ultra-fine particles having a number-average particle size of from 0.5 to 50 nm dispersed therein, and of which the mean birefringence per mm of the optical path length is at most 10 nm (e.g., JP-A 2003-147090); and a thermoplastic material composition comprising a thermoplastic resin having a refractive index and an Abbe's number expressed by specific numerical formulae, and inorganic fine particles having a specific mean particle diameter and a specific refractive index, and an optical part comprising the composition (e.g., JP-A 2003-73563, JP-A 2003-73564, JP-T 2004-524396). These comprise inorganic fine particles dispersed in a resin, but could not exhibit sufficient properties from the viewpoint of dispersing the fine particles in a resin matrix at a high concentration without lowering the transparency of the resin.

On the other hand, regarding an organic-inorganic hybrid composition, for example, reported is a method of melt-kneading inorganic particles organic-modified on their surfaces, and an acid group-having resin, in which, however, the amount of the inorganic particles added is about 1% by mass or so and is not enough (JP-A 2004-217714). Also reported is an organic-inorganic composite composition in which the surface-modifying group of inorganic particles is bonded to a resin via a linker (JP-A 2004-352975); however, this is problematic in that the bonding formation requires high-temperature operation, and in addition, the composition may gel and therefore could not exhibit sufficient properties from the viewpoint of the shaping workability thereof. Anyhow, these references say nothing relating to thick transparent shaped articles usable for high-refractivity lenses.

Plastic lenses produced by the use of the resins described in the above-mentioned JP-A 2002-131502, 10-298287, 2004-244444 and 2-29401 are excellent in that they have a higher refractivity than conventional lenses. However, the lenses are problematic in that the heat resistance of the resins is low and the resins color in thermal shaping; and therefore, they have problems in their production methods and in the products themselves. Specifically, a material composition which satisfies high refractivity, heat resistance, transparency and lightweightness and of which the refractivity can be controlled in any desired manner, and an optical part comprising the composition are not as yet found out, and it is desired to develop them.

SUMMARY OF THE INVENTION

The present invention has been made in consideration of the above-mentioned current situation in the art, and its object is to provide an optical part which satisfies high refractivity, heat resistance, transparency, lightweightness and workability and of which the refractive index can be controlled in any desired manner, and to provide a thermoplastic resin and an organic-inorganic hybrid composition useful for producing the optical part.

The present inventors have assiduously studied for the purpose of attaining the above-mentioned object, and as a result, have found that when a thermoplastic resin having a specific recurring unit is used, then the above-mentioned object can be attained. In addition, the inventors have further found that an organic-inorganic hybrid composition comprising a specific resin having high refractivity and excellent in transparency and inorganic fine particles has high refractivity and excellent transparency owing to the uniformly dispersing effect of the fine particles therein, and have completed the present invention described below.

[1] An optical part comprising a thermoplastic resin having a recurring unit represented by the following formula (1):

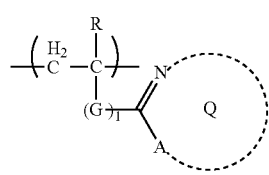

Formula (1)

wherein R represents a hydrogen atom, an alkyl group, or an aryl group; G represents a divalent linking group; A represents an oxygen atom, a sulfur atom, or —N($R^1$)—; $R^1$ represents a hydrogen atom, an alkyl group, or an aryl group; Q represents an atomic group of forming a hetero ring; and l indicates 0 or 1; provided that, when l is 1 and G is represented by the following formula:

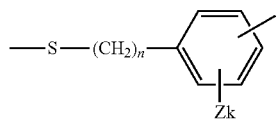

wherein n indicates an integer of 0 or more, Z represents a halogen atom and k indicates an integer of from 0 to 4, then the optical part further comprises inorganic fine particles.

[2] The optical part of [1], of which the light transmittance at a wavelength of 405 nm through a thickness thereof of 1 mm is at least 70%.

[3] The optical part of [1] or [2], of which the refractive index at a wavelength of 589 nm is at least 1.60.

[4] The optical part of any one of [1] to [3], of which the light transmittance at a wavelength of 589 nm through a thickness thereof of 1 mm is at least 70%.

[5] The optical part of any one of [1] to [4], of which the maximum thickness is at least 0.1 mm.

[6] The optical part of any one of [1] to [5], which is a lens substrate.

[7] The optical part of any one of [1] to [6], which comprises inorganic fine particles.

[8] The optical part of any one of [1] to [7], which comprises a thermoplastic resin having a recurring unit represented by the following formula (2):

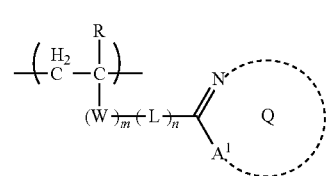

Formula (2)

wherein R represents a hydrogen atom, an alkyl group, or an aryl group; W represents a linking group selected from —C(=O)O—, —C(=O)—, —OC(=O)—, —OC(=O)O—, —O— and —S—; L represents a linking group of —$CH_2$—, —O—, —C(=O)—, an arylene group, or a combination thereof, provided that the end of the linking group on the W side is neither —O— nor —C(=O)—; $A^1$ represents an oxygen atom, a sulfur atom, or —N($R^1$)—; $R^1$ represents a hydrogen atom, an alkyl group, or an aryl group; Q represents an atomic group of forming a nitrogen-containing hetero ring; and m and n each independently indicate 0 or 1.

[9] A thermoplastic resin having a recurring unit represented by the following formula (3):

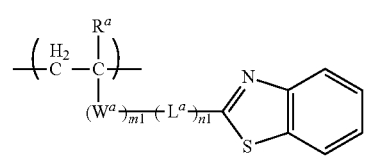

Formula (3)

wherein $R^a$ represents a hydrogen atom, an alkyl group, or an aryl group; $W^a$ represents a linking group selected from —C(=O)O—, —C(=O)—, —OC(=O)—, —OC(=O)O—, —O— and —S—; $L^a$ represents a linking group of —$CH_2$—, —O—, —C(=O)—, an arylene group, or a combination thereof, provided that the end of the linking group on the W side is neither —O— nor —C(=O)—; m1 and n1 each independently indicate 0 or 1, and m1+n1 is 1 or 2.

[10] The thermoplastic resin of [9], which has a glass transition temperature of not lower than 90° C.

[11] The thermoplastic resin of [9] or [10], of which the light transmittance at a wavelength of 405 nm through a thickness thereof of 1 mm is at least 70%.

[12] The thermoplastic resin of any one of [9] to [11], of which the refractive index at a wavelength of 589 nm is at least 1.60.

[13] An organic-inorganic hybrid composition comprising a thermoplastic resin having a recurring unit represented by the following formula (1), and inorganic fine particles:

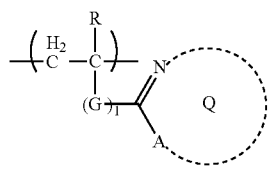

Formula (1)

wherein R represents a hydrogen atom, an alkyl group, or an aryl group; G represents a divalent linking group; A represents an oxygen atom, a sulfur atom, or —N($R^1$)—; $R^1$ represents a hydrogen atom, an alkyl group, or an aryl group; Q represents an atomic group of forming a hetero ring; and l indicates 0 or 1.

[14] The organic-inorganic hybrid composition of [13], wherein the refractive index at a wavelength of 589 nm of the thermoplastic resin is at least 1.63.

[15] The organic-inorganic hybrid composition of [13] or [14], wherein the thermoplastic resin contains the recurring unit represented by the formula (1) in an amount of from 1 to 99% by mass.

[16] The organic-inorganic hybrid composition of any one of [13] to [15], wherein the thermoplastic resin has a functional group selected from the following:

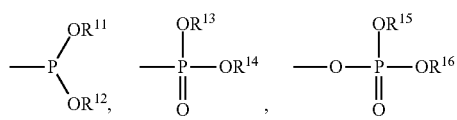

—$OSO_3H$ or a salt thereof, —$CO_2H$ or a salt thereof, —OH, and —Si($OR^{17}$)$_{m1}$$R^{18}$$_{3-m1}$ wherein $R^{11}$, $R^{12}$, $R^{13}$, $R^{14}$, $R^{15}$ and $R^{16}$ each independently represent a hydrogen atom, a substituted or unsubstituted alkyl group, a substituted or unsubstituted alkenyl group, a substituted or unsubstituted alkynyl group, a substituted or unsubstituted aryl group, or an atom or a group capable of forming a salt; $R^{17}$ and $R^{18}$ each independently represent a hydrogen atom, a substituted or unsubstituted alkyl group, a substituted or unsubstituted alkenyl group, a substituted or unsubstituted alkynyl group, a substituted or unsubstituted aryl group, or an atom or a group capable of forming a salt; and m1 indicates an integer of from 1 to 3].

[17] The organic-inorganic hybrid composition of [16], wherein the thermoplastic resin has the functional group in an amount of from 0.1 to 20/polymer chain on average.

[18] The organic-inorganic hybrid composition of any one of [13] to [17], wherein the refractive index at a wavelength of 589 nm of the inorganic fine particles falls within a range of from 1.90 to 3.00.

[19] The organic-inorganic hybrid composition of any one of [13] to [18], wherein the inorganic fine particles contain at least one selected from a group consisting of zirconium oxide, zinc oxide, tin oxide and titanium oxide.

[20] The organic-inorganic hybrid composition of any one of [13] to [19], wherein the number-average particle size of the inorganic fine particles is from 1 to 15 nm.

[21] The organic-inorganic hybrid composition of any one of [13] to [20], which contains the inorganic fine particles in an amount of at least 20% by mass.

[22] A shaped article of the organic-inorganic hybrid composition of any one of [13] to [21].

[23] The shaped article of [22], of which the light transmittance at a wavelength of 589 nm through a thickness thereof of 1 mm is at least 70%.

[24] The shaped article of [22] of [23], of which the refractive index at a wavelength of 589 nm is at least 1.60.

[25] The shaped article of any one of [22] to [24], of which the maximum thickness is at least 0.1 mm.

The optical part of the invention has high refractivity and is excellent in heat resistance, transparency, lightweightness and workability. The organic-inorganic hybrid composition satisfies high refractivity, heat resistance, transparency, lightweightness and workability. The thermoplastic resin of the invention has a novel recurring unit, and is excellent in high refractivity, heat resistance, transparency, lightweightness, workability and coloring resistance. According to the invention, the refractivity of the optical part can be controlled in any desired manner.

MODES FOR CARRYING OUT THE INVENTION

The thermoplastic resin, the organic-inorganic hybrid composition and the optical parts of the invention such as lens substrate comprising the resin or the composition are described in detail below. The descriptions about the constitutive requirements as described below are sometimes based on typical embodiments for carrying out the invention. However, the invention is never limited to such embodiments. Herein, the numerical range expressed with "to" means the range where the numerical figures before and after the word "to" are the lower limit and the upper limit, respectively.

[Optical Parts]

The optical part of the invention is characterized by comprising a thermoplastic resin having a recurring unit represented by the following formula (1):

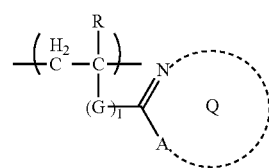

Formula (1)

wherein R represents a hydrogen atom, an alkyl group, or an aryl group; G represents a divalent linking group; A represents an oxygen atom, a sulfur atom, or —N($R^1$)—; $R^1$ represents a hydrogen atom, an alkyl group, or an aryl group; Q represents an atomic group of forming a hetero ring; and l indicates 0 or 1; provided that, when l is 1 and G is represented by the following formula:

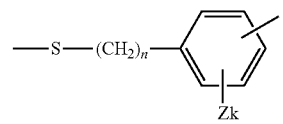

wherein n indicates an integer of 0 or more, Z represents a halogen atom and k indicates an integer of from 0 to 4, then the optical part further comprises inorganic fine particles.

The type of the optical parts of the invention is not specifically limited. The shaped article is preferably used, particularly as optical parts utilizing the great optical properties of the organic-inorganic hybrid composition, particularly as optical parts with optical transmission (so-called passive optical parts). Optically functional apparatuses with such optical parts include for example various display apparatuses (liquid-crystal display, plasma display, etc.), various projector apparatuses (OHP, liquid crystal projector, etc.), optical fiber communication apparatuses (optical waveguide, optical amplifier, etc.), and imaging apparatuses such as camera and video camera.

The passive optical parts for use in the optically functional apparatuses include for example lens, prism, prism sheet, panel (plate-like shaped article), film, optical waveguides (in film-like or fiber-like shapes), optical disk, and encapsulants for LED. If necessary, the passive optical parts may be prepared into a multilayer structure by arranging an appropriate coating layer, for example a protective layer for preventing mechanical damages of the coating face via abrasion or wear, an optically absorption layer for absorbing the light of an undesired wavelength as a cause of deteriorating for example the inorganic fine particles and the substrates, a transmission-shield layer for suppressing or preventing reactive lower molecules such as water and oxygen gas, a glare-shield layer, a reflection-preventing layer, a layer with a small refractive index, and an appropriate additive functional layer. Specific examples of the appropriate coating layer include transparent conductive films and gas barrier films comprising inorganic oxide coating layers, and gas barrier films and hard coat comprising organic coating layers. As the coating method therefor, known coating processes such as vacuum deposition, CVD process, sputtering process, dip-coat process, and spin-coat process may be used.

Optical parts of the invention are preferable for lens substrates in particular. Lens substrates produced by using the organic-inorganic hybrid composition of the invention have great refractive properties, optical transmission properties, and lightweight properties in combination, and have also excellent optical properties. Additionally by appropriately adjusting the type of the monomers composing the organic-inorganic hybrid composition and the amount of the inorganic fine particles to be dispersed, the refractive indices of the lens substrates may appropriately be adjusted.

The term "lens substrate" in accordance with the invention means a single member capable of exerting the lens functions. On the surface of the lens substrate and in the circumference thereof, a film or a member may be arranged, depending on the environment where the lens is used as well as the use thereof. On the surface of the lens substrate, for example, a protective film, a reflection-preventing film, or a hard coat film may be formed. Additionally, the circumference of the lens substrate may be inserted in a frame holding the substrate, for fixing the lens substrate. Herein, these films and frames are members to be added to the lens substrates in accordance with the invention and therefore, the films and frames are discriminated from the lens substrate per se in accordance with the invention.

When the lens substrate in accordance with the invention is utilized as a lens, the lens substrate of the invention per se may be used as a lens, or the lens substrate to which a film or a frame is additionally arranged may be used as a lens. The type or shape of the lens using the lens substrate of the invention is not specifically limited. The lens substrate of the invention is used as for example eyeglass lens, lens for optical apparatuses, lens for opto-electronics, lens for laser, lens for pickups, lens for in-vehicle camera, lens for portable camera, lens for digital camera, lens for OHP, and microlens arrays).

In producing the optical part of the invention that comprises the thermoplastic resin having a recurring unit represented by the formula (1), the thermoplastic resin of the invention having a recurring unit of formula (1) alone may be used as the material, or it may be combined with any other material. In case where the resin is combined with any other material, for example, preferably used are the inorganic fine particles described in JP-A 2002-241612, 2005-298717, 2006-70069, etc. If desired, additives such as dispersant, plasticizer, release agent, antistatic agent, surface-treating agent, wax, UV absorbent, antioxidant and the like may be added to the resin. The proportion of the thermoplastic resin in the material composition for producing optical parts such as lenses is preferably from 20 to 100% by weight, more preferably from 30 to 100% by weight, even more preferably from 40 to 100% by weight. In case where a thermoplastic resin of formula (1) where l is 1 and G is —$CH_2$—S— is used, the optical part contains inorganic fine particles. In this, preferably, the thermoplastic resin and the inorganic fine particles are uniformly mixed.

The optical part of the invention that comprises the thermoplastic resin having a recurring unit represented by the formula (1) can be produced by melting a composition containing the thermoplastic resin having a recurring unit of formula (1) or dissolving it in a solvent, followed by shaping the melt or the solution. In shaping it, employable is a casting method, or any other shaping method comprising concentrating the solution of the resin composition, freeze-drying it or reprecipitating it from a suitable poor solvent to thereby remove the solvent, and then shaping the powdered solid in any known manner of injection molding, compression molding or the like. In the latter case, a preform having a predetermined weight and a predetermined form may be once formed through extrusion or the like, and thereafter the preform may be further worked through compression molding into lenses or the like optical parts. In this case, the preform may be so designed as to have a suitable curvature for efficiently forming the intended shape. The thermoplastic resin for use in the invention has the advantages of easy workability and coloring resistance in heating, and is therefore advantageous in that the shaped products thereof is hardly colored.

[Thermoplastic Resin]
(Recurring Unit of Formula (1))

The thermoplastic resin for use in the invention is characterized in that it has a recurring unit represented by the following formula (1). The thermoplastic resin is a vinyl polymer to be produced through vinyl monomer polymerization.

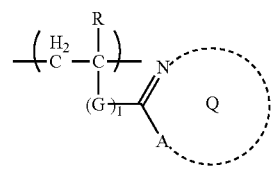

Formula (1)

In formula (1), R represents a hydrogen atom, an alkyl group, or an aryl group. The alkyl group preferably has from 1 to 10 carbon atoms, more preferably from 1 to 6 carbon atoms, even more preferably from 1 to 3 carbon atoms (e.g., methyl, ethyl, propyl). Most preferred is a methyl group. The aryl group preferably has from 6 to 18 carbon atoms, more preferably from 6 to 10 carbon atoms, and is most preferably a phenyl group having 6 carbon atoms. R is preferably a hydrogen atom or an alkyl group, more preferably a hydrogen atom or a methyl group.

G represents a divalent linking group. When l is 1 and G is —CH$_2$—S—, then the optical part of the invention further contains inorganic fine particles. Preferably, G is a divalent linking group of —C(=O)O—, —C(=O)—, —OC(=O)—, —OC(=O)O—, —O—, —S—, —CH$_2$—, an arylene group, or a combination thereof. The divalent linking group of their combination includes, arylene-(CH$_2$)$_p$—O—, arylene-(CH$_2$)$_p$—O-arylene, arylene-C(=O)O-arylene, —C(=O)O-arylene, —C(=O)O—(CH$_2$)$_p$—, —C(=O)O—(CH$_2$)$_p$-arylene, —C(=O)O—(CH$_2$)$_p$—O—, —C(=O)O-arylene-O— (wherein p indicates an integer of from 1 to 4, and is preferably 1 or 2). The bonding site of the arylene group may be any of o-, m- or p-position, but is preferably o- or p-position. Preferably, the arylene group has from 6 to 18 carbon atoms, more preferably from 6 to 10 carbon atoms, even more preferably 6 carbon atoms. Preferably, G is a linking group containing an arylene group, more preferably a linking group containing a phenylene group. Preferred examples of the linking group for G include —C(=O)—, arylene, arylene-(CH$_2$)$_p$—O-arylene, arylene-C(=O)O-arylene, C(=O)O-arylene, C(=O)O—(CH$_2$)$_p$—, C(=O)O—(CH$_2$)$_p$-arylene, C(=O)O—(CH$_2$)$_p$—O—.

A represents an oxygen atom, a sulfur atom, or —N(R$^1$)—, preferably an oxygen atom or a sulfur atom, more preferably a sulfur atom. R$^1$ represents a hydrogen atom, an alkyl group, or an aryl group. Examples and preferred ranges of the alkyl group and the aryl group are the same as the examples and the preferred ranges of the alkyl group and the aryl group for R mentioned in the above. R$^1$ is preferably a hydrogen atom or an alkyl group, more preferably a hydrogen atom.

Q represents an atomic group of forming a nitrogen-containing hetero ring, and is preferably a 5- to 7-membered ring, more preferably a 5- or 6-membered ring, even more preferably a 5-membered ring, still more preferably a benzo-condensed ring. Concretely, it includes a benzothiazole ring, a benzoxazole ring, a benzimidazole ring; and preferred are a benzothiazole ring and a benzoxazole ring.

l is 0 or 1.

The alkyl group and the aryl group for R, the methylene group, the arylene group and the like capable of constituting the linking group for G, the alkyl group and the aryl group for R$^1$, and the nitrogen-containing hetero ring to be formed by Q may have a substituent. The substituent includes, for example, a halogen atom (e.g., fluorine atom, chlorine atom, bromine atom, iodine atom), an alkyl group (e.g., methyl group, ethyl group), an aryl group (e.g., phenyl group, naphthyl group), a cyano group, an alkoxycarbonyl group (e.g., methoxycarbonyl group), an aryloxycarbonyl group (e.g., phenoxycarbonyl group), an alkoxy group (e.g., methoxy group), an aryloxy group (e.g., phenoxy group), an alkylthio group (e.g., methylthio group), an arylthio group (e.g., phenylthio group), etc. These substituents may be further substituted. In case where the group is substituted with plural substituents, the substituents may be the same or different. The substituents are preferably a halogen atom, an alkyl group, an aryl group, an alkoxy group, an aryloxy group, more preferably a halogen atom, an alkyl group, an aryl group.

The resin having a recurring unit of the above-mentioned formula (1) is preferably a resin having a recurring unit of the following formula (2):

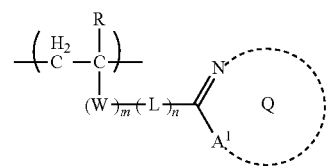

Formula (2)

In formula (2), R, A$^1$ and Q are the same as in formula (1).

In formula (2), W represents a linking group selected from —C(=O)O—, —C(=O)—, —OC(=O)—, —OC(=O)O—, —O— and —S—. W is preferably —C(=O)O— or —C(=O)—, more preferably —C(=O)O—.

L represents a linking group of —CH$_2$—, —O—, —C(=O)—, an arylene group, or a combination thereof, provided that the end of the linking group on the W side is neither —O— nor —C(=O)—. Accordingly, in case where —O— or —C(=O)— directly bonds to the main chain, that —O— or —C(=O)— is considered as W. L includes —(CH$_2$)$_p$—, arylene, arylene-C(=O)O—, arylene-C(=O)O-arylene, —(CH$_2$)$_p$—O—, arylene-(CH$_2$)$_p$—, arylene-(CH$_2$)$_p$—O—, arylene-(CH$_2$)$_p$—O-arylene, —(CH$_2$)$_p$-arylene, —(CH$_2$)$_p$-arylene-O—, —(CH$_2$)$_p$-arylene-O-arylene- (p is an integer of from 1 to 4, and is preferably 1 or 2), and is preferably —CH$_2$—, arylene, arylene-C(=O)O-arylene, —(CH$_2$)$_p$—O—, arylene-(CH$_2$)$_p$—O—, arylene-(CH$_2$)$_p$—O-arylene, —(CH$_2$)$_p$-arylene (p is an integer of from 1 to 4, and is preferably 1 or 2). The bonding site of the arylene group may be any of o-, m- or p-position, but is preferably o- or p-position. Preferably, L is a linking group containing an arylene group, more preferably a linking group containing a phenylene group. Also preferably, L is an arylene group, more preferably an arylene group having from 6 to 18 carbon atoms, even more preferably an arylene group having from 6 to 10 carbon atoms, still more preferably a phenylene group.

m and n each independently indicate 0 or 1. Preferably, m=0 and n=0; or m=0 and n=1; or m=1 and n=1.

More preferably, the resin having a recurring unit of formula (1) is a novel resin having a recurring unit represented by the following formula (3):

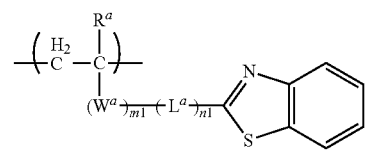

Formula (3)

In formula (3), R$^a$ represents a hydrogen atom, an alkyl group, or an aryl group; W$^a$ represents a linking group selected from —C(=O)O—, —C(=O)—, —OC(=O)—, —OC(=O)O—, —O— and —S—; L$^a$ represents a linking group of —CH$_2$—, —O—, —C(=O)—, an arylene group, or a combination thereof (provided that the end of the linking group on the W side is neither —O— nor —C(=O)—); m1 and n1 each independently indicate 0 or 1, and m1+n1 is 1 or 2.

Specific examples and preferred ranges of R$^a$, W$^a$ and L$^a$ in formula (3) are the same as the specific examples and the preferred ranges of R, W and L in formula (2).

The benzene ring fusing with the nitrogen-containing hetero ring in formula (3) may have a substituent. Preferred examples of the substituent are the same as those mentioned hereinabove for the substituent of the hetero ring formed by Q in formula (1). The substituent may be further substituent. When the group has plural substituents, they may be the same or different. Regarding m1 and n2, preferably, m1=1 and n1=1, or m1=0 and n1=1.

Examples of the vinyl monomer capable of forming a recurring unit represented by the formula (1) by polymerization are described below, but the monomer that can be used in the invention is not limited to those. Examples of the recurring unit represented by the formula (1) can be provided by substituting an ethylene group for the vinyl group of the vinyl monomers below.

M-1
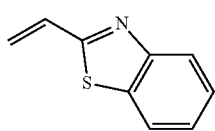

M-2
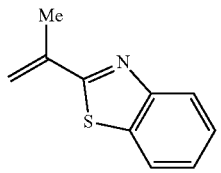

M-3
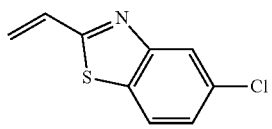

M-4
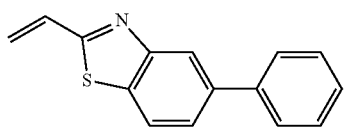

M-5
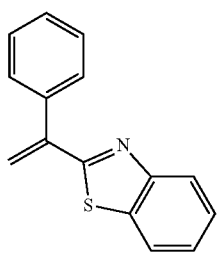

M-6

M-7
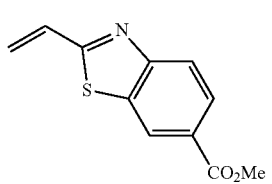

M-8
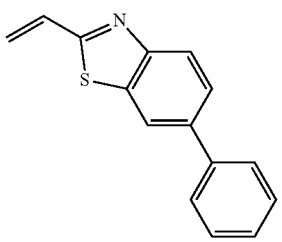

M-9
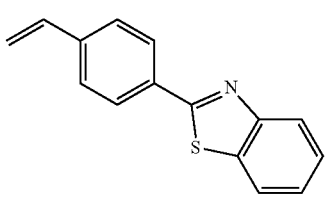

M-10
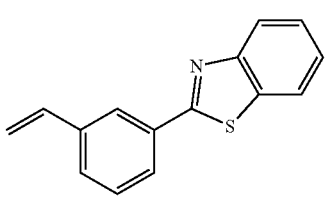

M-11
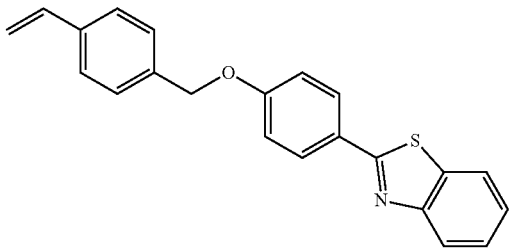

M-12
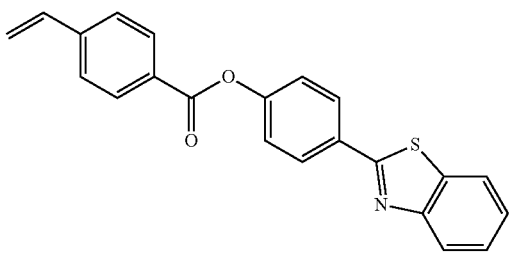

M-13
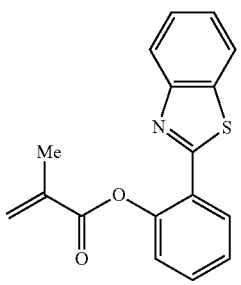

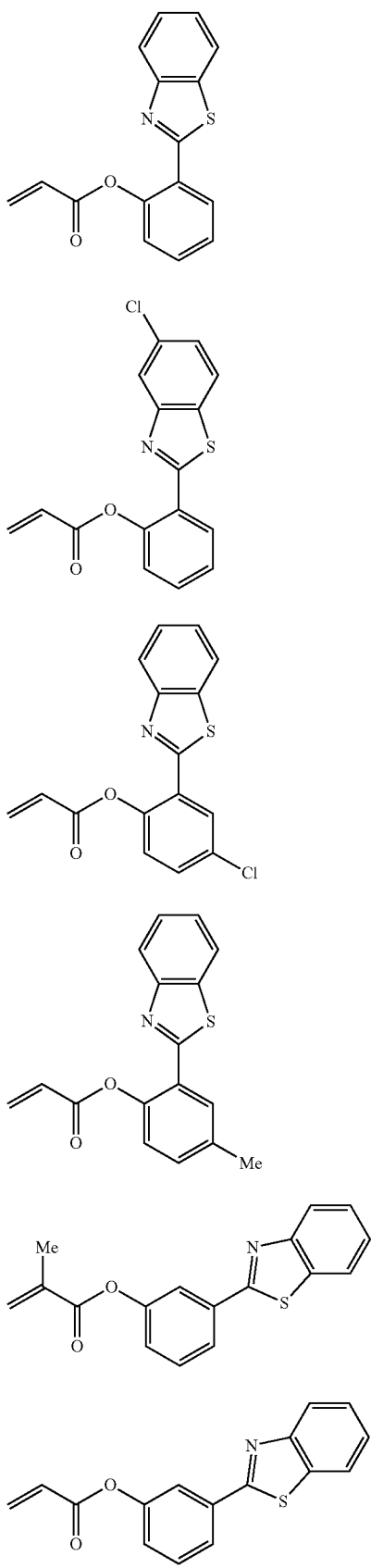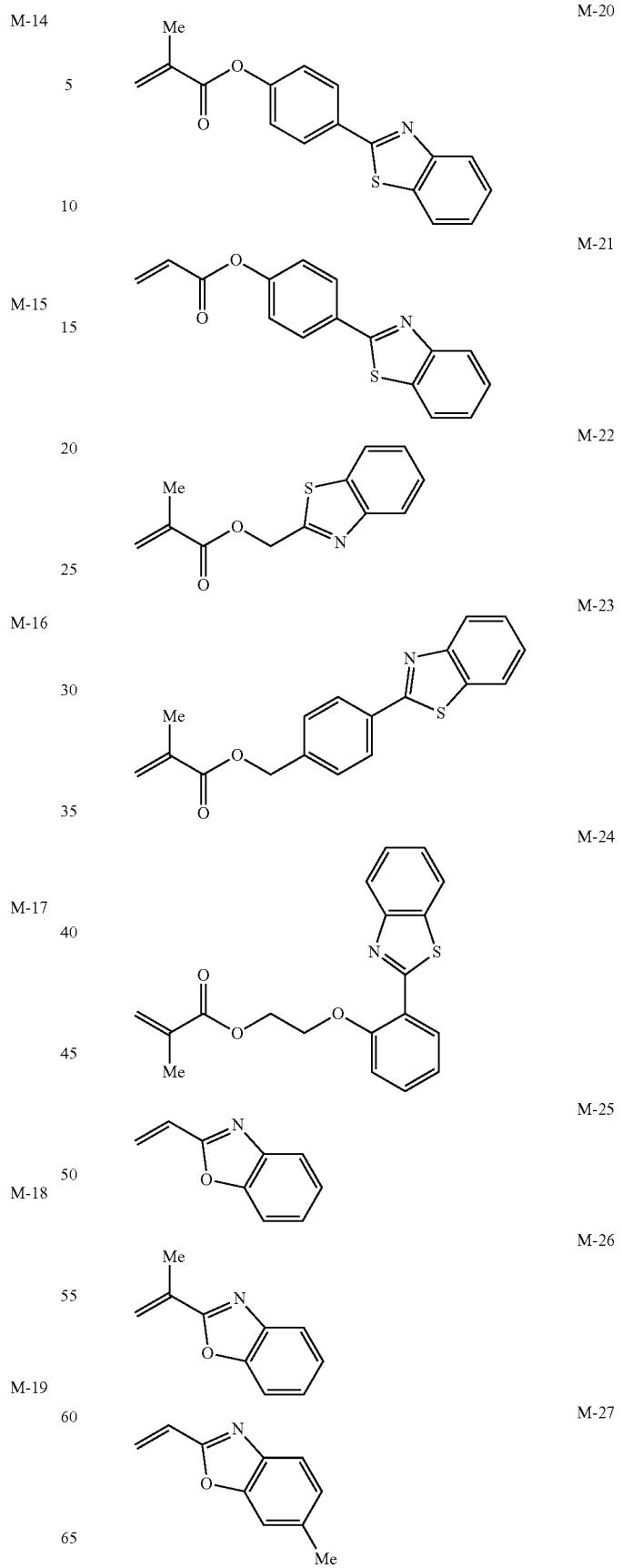

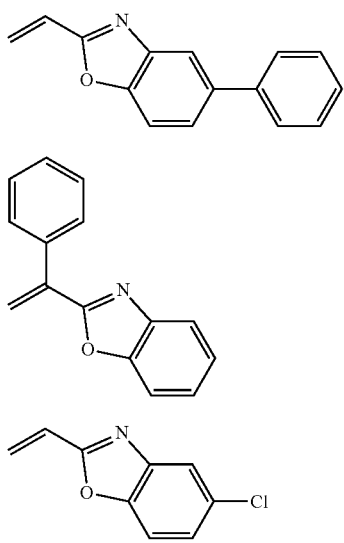
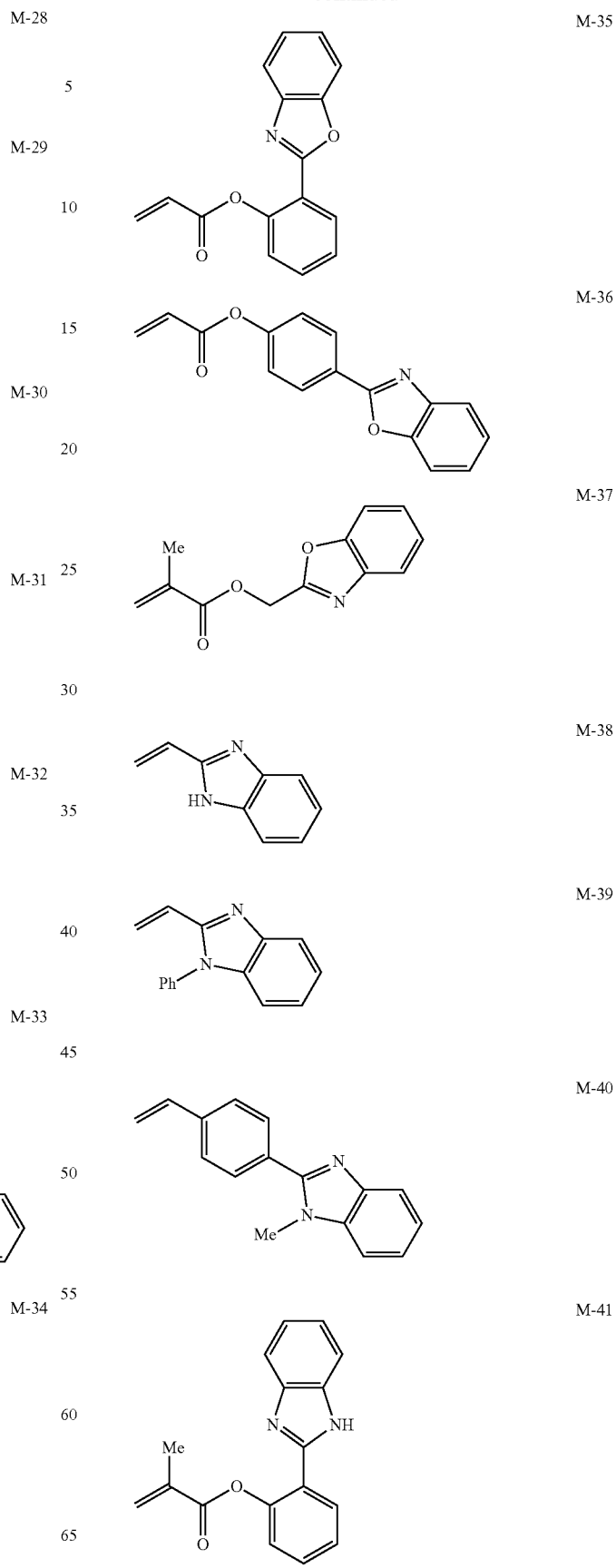

M-42

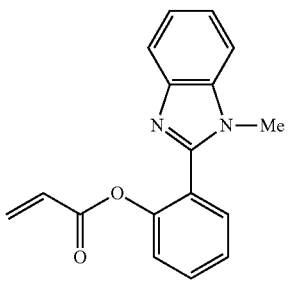

(Copolymerizable Monomer)

The thermoplastic resin of the invention may be a copolymer of a monomer capable of forming the recurring unit represented by the formula (1) and other monomer. The other copolymerizable monomer includes for example those described in Polymer Handbook, the 2nd ed., J. Brandrup, Wiley Interscience (1975), Chapter 2, Page 1 to 483.

Specifically, the copolymerizable monomer includes for example compounds with one addition-polymerizable unsaturated bond, which are selected from styrene derivatives, 1-vinylnaphthalene, 2-vinylnaphthalene, vinylcarbazol, acrylic acids, methacrylic acids, acrylate esters, methacrylate esters, acrylamides, methacrylamides, allyl compounds, vinyl ethers, vinyl esters, dialkyl itaconates, and dialkyl esters or monoalkyl esters of fumaric acid.

The styrene derivatives include for example styrene, 4-chlorostyrene, 2,4,6-tribromostyrene and 2-phenylstyrene.

The acrylate esters include for example methyl acrylate, ethyl acrylate, propyl acrylate, n-butyl acrylate, tert-butyl acrylate, 2-phenylphenyl acrylate, 4-phenylphenyl acrylate, chloroethyl acrylate, 2-hydroxyethyl acrylate, trimethylolpropane monoacrylate, benzyl acrylate, methoxybenzyl acrylate, furfuryl acrylate and tetrahydrofuryl acrylate.

The methacrylate esters include for example methyl methacrylate, ethyl methacrylate, propyl methacrylate, butyl methacrylate, tert-butyl methacrylate, 2-phenylphenyl methacrylate, 4-phenylphenylmethacrylate, chlorochloroethyl methacrylate, 2-hydroxyethylmethacrylate, trimethylolpropane monomethacrylate, benzyl methacrylate, methoxybenzyl methacrylate, furfuryl methacrylate and tetrahydrofurfuryl methacrylate.

The acrylamides include for example acrylamide, N-alkyl acrylamide (where the alkyl group is with 1 to 3 carbon atoms, for example methyl group, ethyl group and propyl group), N,N-dialkyl acrylamide (where the alkyl group is with 1 to 6 carbon atoms), N-hydroxyethyl-N-methyl acrylamide, and N-2-acetamideethyl-N-acetyl acrylamide.

The methacrylamides include for example methacrylamide, N-alkyl methacrylamide (where the alkyl group is with 1 to 3 carbon atoms, for example methyl group, ethyl group and propyl group), N,N-dialkyl methacrylamide (where the alkyl group is with 1 to 6 carbon atoms), N-hydroxyethyl-N-methyl methacrylamide, and N-2-acetamideethyl-N-acetyl methacrylamide.

The allyl compounds include for example allyl esters (for example, allyl acetate, allyl caproate, allyl caprylate, allyl laurate, allyl palmitate, allyl stearate, allyl benzoate, allyl acetoacetate, and allyl lactate), and allyl oxyethanol.

The vinyl ethers include for example alkyl vinyl ether (where the alkyl group is with 1 to 10 carbon atoms, for example hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethyl-propyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether.

The vinyl esters include for example vinyl butylate, vinyl isobutylate, vinyl trimethyl acetate, vinyl diethyl acetate, vinyl valate, vinyl caproate, vinyl chloroacetate, vinyl dichloroacetate, vinyl methoxyacetate, vinyl butoxyacetate, vinyl lactate, vinyl-β-phenyl butylate, and vinylcyclohexyl carboxylate.

The dialkyl itaconates include for example dimethyl itaconate, diethyl itaconate, and dibutyl itaconate. The dialkyl esters or monoalkyl esters of fumaric acid include for example dibutyl fumarate.

In addition, crotonic acid, itaconic acid, acrylonitrile, methacrylonitrile and maleironitrile are also included.

Preferable copolymerizable monomers are styrene derivatives, 1-vinylnaphthalene, 2-vinylnaphthalene, vinylcarbazol, acrylic acids, methacrylic acids, acrylate esters, methacrylate esters and acrylonitorile. More preferable copolymerizable monomers are styrene derivatives, acrylic acids, methacrylic acids and acrylonitorile.

In the copolymerization of the monomer capable of forming the recurring unit represented by the formula (1) and the other monomer, the copolymerization ratio is not specifically limited. The ratio of the monomer capable of forming the recurring unit represented by the formula (1) relative to all the monomers is preferably 10 to 100% by weight, more preferably 30 to 100% by weight, still more preferably 50 to 100% by weight.

Preferable examples of the copolymerizable monomers that can be used in the preparation of the thermoplastic resin of the invention are described below, but the copolymerizable monomers that can be used in the invention is not limited to those.

B-1

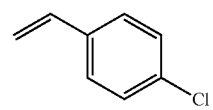

B-2

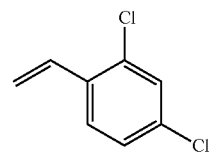

B-3

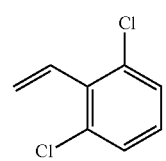

B-4

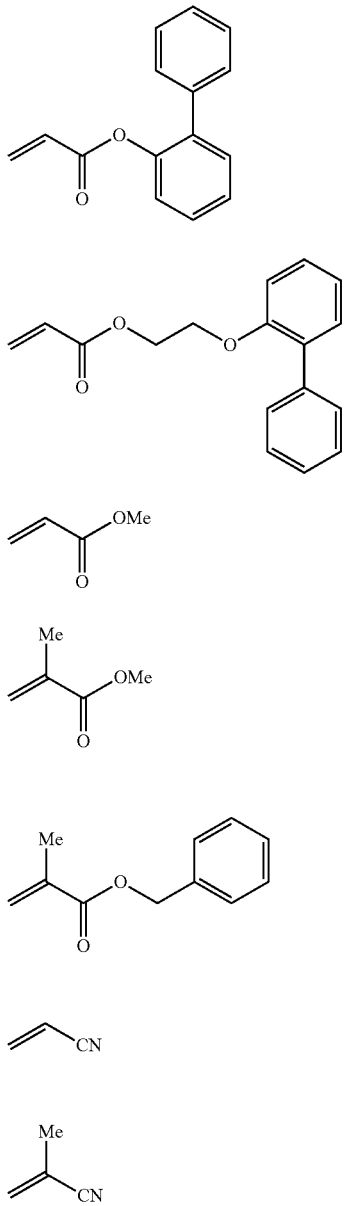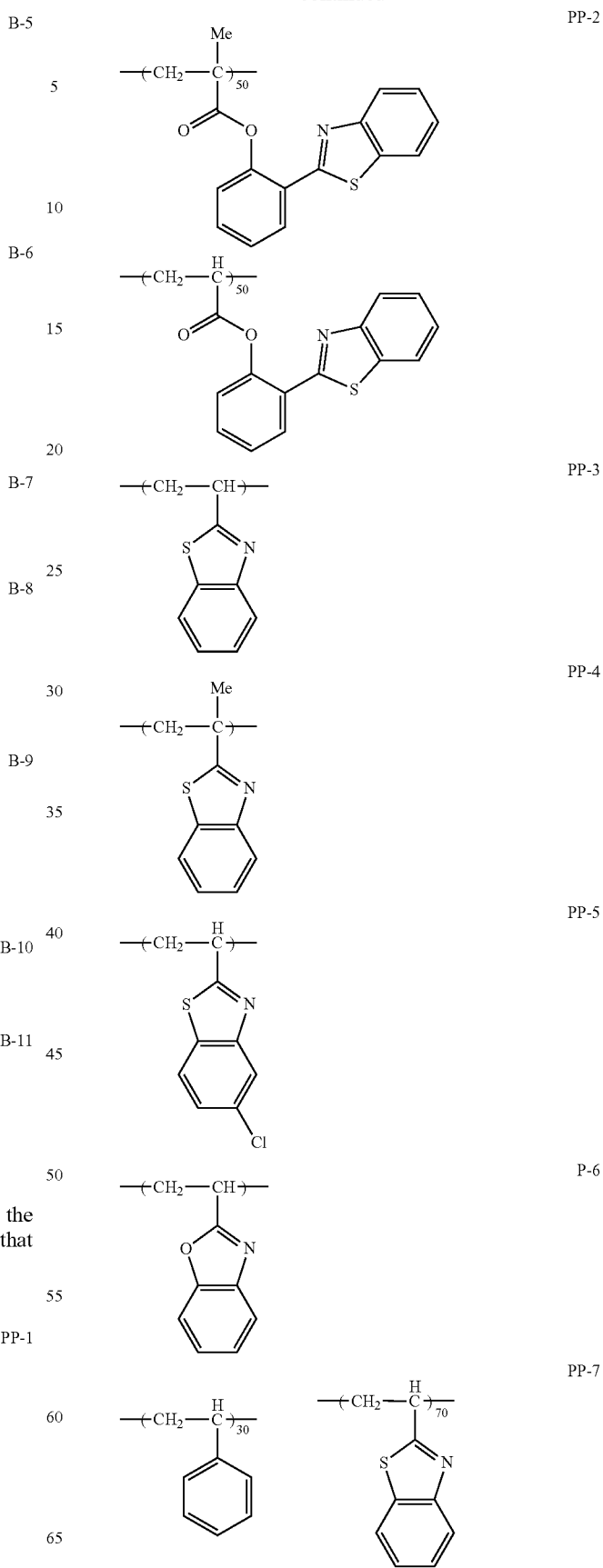
(Examples of the Thermoplastic Resin)
Preferable examples of the thermoplastic resin of the invention are described below, but the thermoplastic resin that can be used in the invention is not limited to those.

PP-8
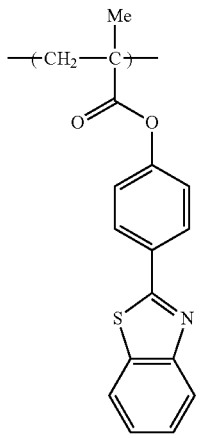
PP-12
PP-9
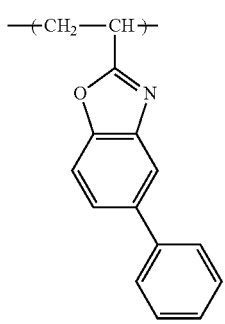
PP-13
PP-10
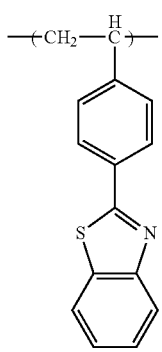
PP-14
PP-11
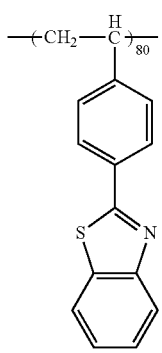 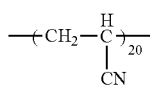
PP-15
PP-16
PP-17

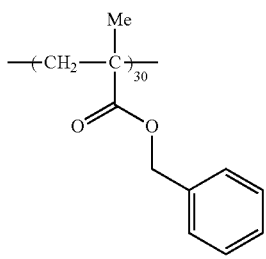

PP-18

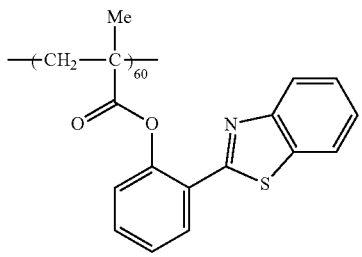

PP-19

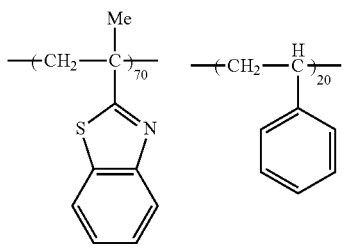

PP-20

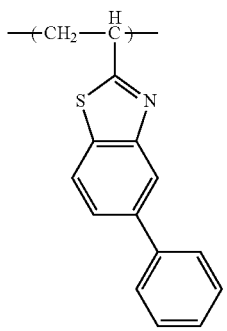

PP-21

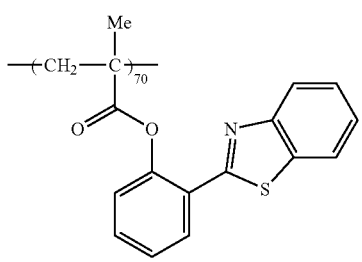

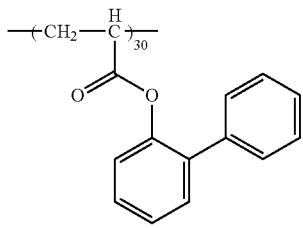

PP-22

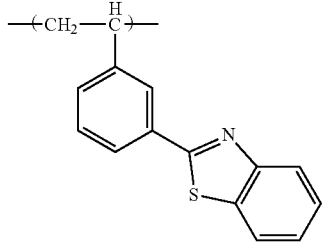

PP-23

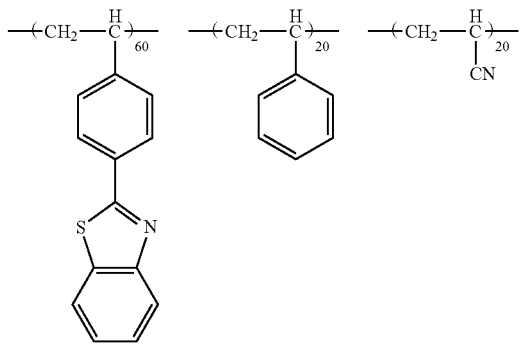

The thermoplastic resin used in the invention has a number average molecular weight of preferably from 1,000 to 500,000, more preferably from 3,000 to 300,000, and particularly preferably from 10,000 to 100,000. Where the weight average molecular weight of the thermoplastic resin is not larger than 500,000, processability of the resin is improved, and where it is not less than 1,000, an organic-inorganic hybrid composition having sufficient mechanical strength can be obtained.

The "number average molecular weight" used herein is a molecular weight in terms of a polystyrene conversion by detection of a differential refractometer (solvent: hydroquinone) with GPC analyzer using columns of TSK gel GMHxL, TSK gel G4000HxL and TSK gel G2000HxL, products of Tosoh Corporation.

The thermoplastic resin used in the invention has a glass transition temperature of preferably from 90 to 400° C., and more preferably from 110 to 380° C. When a resin having a glass transition temperature of 90° C. or higher is used, an optical component having sufficient heat resistance is liable to be obtained. Further, when a resin having a glass transition temperature of 400° C. or lower is used, there is the tendency that processing is liable to conduct.

The thermoplastic resin used in the invention has a refractive index of preferably 1.60 or more, more preferably 1.63 or more, still more preferably 1.65 or more, particularly preferably 1.68 or more. Those refractive indexes are a value at a wavelength of 589 nm at 22° C.

The thermoplastic resin used in the invention has a light transmittance of preferably 70% or more, more preferably 80% or more, and particularly preferably 85% or more, at a wavelength of 589 nm in terms of the resin having a thickness of 1 mm. The thermoplastic resin used in the invention has a light transmittance of preferably 60% or more, more preferably 70% or more, and particularly preferably 75% or more, at a wavelength of 405 nm in terms of the resin having a thickness of 1 mm. The thermoplastic resin of the invention preferably maintains its refractive index within the preferable range above and prohibits coloring after heating for example at 140 to 240° C. to form an article.

(Thermoplastic Resin Having a Functional Group Capable of Forming a Chemical Bond with Inorganic Fine Particle)

The thermoplastic resin to be used in the invention has a functional group capable of forming an arbitrary chemical bond with inorganic fine particle. Examples of the chemical bond as referred to herein include a covalent bond, an ionic bond, a coordination bond and a hydrogen bond. In the case where plural functional groups are present, these functional groups may be each one capable of forming a different chemical bond with the inorganic fine particle. Whether or not a chemical bond can be formed is judged by whether or not when the thermoplastic resin and the inorganic fine particle are mixed in an organic solvent, the functional group or groups of the thermoplastic resin can form a chemical bond with the inorganic fine particle. All of the functional groups of the thermoplastic resin may form a chemical bond with the inorganic fine particle, or a part of the functional groups of the thermoplastic resin may form a chemical bond with the inorganic fine particle. The thermoplastic resin may have the functional group capable of forming a chemical bond with the inorganic fine particle in its side chain, at the terminal or both.

The functional group capable of being bound with the inorganic fine particle has a function for stably dispersing the inorganic fine particle in the thermoplastic resin upon the formation of a chemical bond with the inorganic fine particle. The functional group capable of forming a chemical bond with the inorganic fine particle is a functional group selected among the following groups:

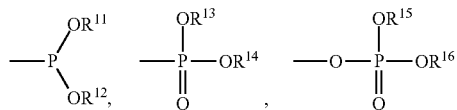

In the above formulae, $R^{11}$, $R^{12}$, $R^{13}$, $R^{14}$, $R^{15}$ and $R^{16}$ each independently represents a hydrogen atom, a substituted or unsubstituted alkyl group, a substituted or unsubstituted alkenyl group, a substituted or unsubstituted alkynyl group, a substituted or unsubstituted aryl group or an atom or group capable of forming a salt), —$SO_3H$ or a salt thereof, —$OSO_3H$ or a salt thereof, —$CO_2H$ or a salt thereof, —OH and —$Si(OR^{17})_{m1}R^{18}_{3-m1}$ (wherein $R^{17}$ and $R^{18}$ each independently represents a hydrogen atom, a substituted or unsubstituted alkyl group, a substituted or unsubstituted alkenyl group, a substituted or unsubstituted alkynyl group, a substituted or unsubstituted aryl group or an atom or group capable of forming a salt; and m1 represents an integer of from 1 to 3.

Preferable range of $R^{11}$, $R^{12}$, $R^{13}$, $R^{14}$, $R^{15}$ and $R^{16}$ is as follows:

The alkyl group preferably has from 1 to 30 carbon atoms, and more preferably from 1 to 20 carbon atoms, and examples thereof include a methyl group, an ethyl group and an n-propyl group. The substituted alkyl group includes, for example, an aralkyl group. The aralkyl group preferably has from 7 to 30 carbon atoms, and more preferably from 7 to 20 carbon atoms, and examples thereof include a benzyl group and a p-methoxybenzyl group. The alkenyl group preferably has from 2 to 30 carbon atoms, and more preferably from 2 to 20 carbon atoms, and examples thereof include a vinyl group and a 2-phenylethenyl group. The alkynyl group preferably has from 2 to 20 carbon atoms, and preferably from 2 to 10 carbon atoms, and examples thereof include an ethynyl group and a 2-phenylethynyl group. The aryl group preferably has from 6 to 30 carbon atoms, and more preferably from 6 to 20 carbon atoms, and examples thereof include a phenyl group, a 2,4,6-tribromophenyl group and a 1-naphthyl group. The aryl group as referred to herein includes a heteroaryl group. Examples of the substituent of each of the alkyl group, the alkenyl group, the alkynyl group and the aryl group include, in addition to these alkyl group, alkenyl group, alkynyl group and aryl group, a halogen atom (for example, a fluorine atom, a chlorine atom, a bromine atom, an iodine atom) and an alkoxy group (for example, a methoxy group and an ethoxy group). $R^{11}$, $R^{12}$, $R^{13}$, $R^{14}$, $R^{15}$ and $R^{16}$ are each especially preferably a hydrogen atom.

Preferred ranges of $R^{17}$ and $R^{18}$ are the same as in $R^{11}$, $R^{12}$, $R^{13}$, $R^{14}$, $R^{15}$ and $R^{16}$.

m1 is preferably 3.

Of these functional groups, the following groups:

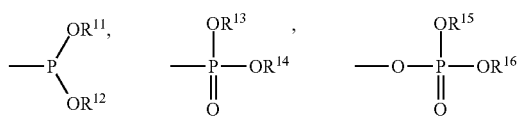

—$SO_3H$ or a salt thereof, —$OSO_3H$ or a salt thereof, —$CO_2H$ or a salt thereof and —$Si(OR^{17})_{m1}R^{18}_{3-m1}$ are preferable; and the following groups:

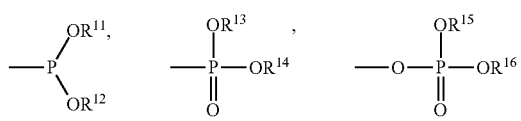

and —$CO_2H$ or a salt thereof are more preferable; and the following groups:

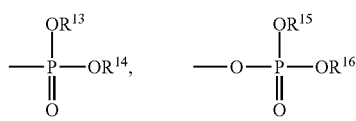

and —$CO_2H$ or a salt thereof are particularly preferable.

The thermoplastic resin having a functional group capable of forming a chemical bond with inorganic fine particle that can be used in the invention is particularly preferably a copolymer having a recurring unit represented by the following formula (4):

Formula (4)

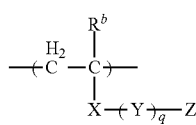

The copolymer can be prepared by copolymerizing a vinyl monomer represented by the following formula (5):

Formula (5)

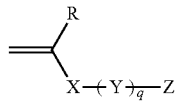

In the formulae (4) and (5), $R^b$ represents a hydrogen atom, a halogen atom or a methyl group; X represents a divalent linking group selected from the group consisting of —$CO_2$—, —OCO—, —CONH—, —OCONH—, —OCOO—, —O—, —S—, —NH— and substituted or unsubstituted arylene groups. Preferable are —$CO_2$— and a p-phenylene group.

Y represents a divalent linking group having 1 to 30 carbon atoms. The number of carbon atoms is preferably 1 to 20, more preferably 2 to 10, still more preferably 2 to 5. Examples of the divalent linking group include an alkylene group, an alkyleneoxy group, an alkyleneoxycarbonyl group, an arylene group, an aryleneoxy group, an aryleneoxycarbonyl group, and a combination thereof. Preferable is an alkylene group.

q is an integer of 0 to 18, preferably an integer of 0 to 10, more preferably an integer of 0 to 5, particularly preferably an integer of 0 or 1.

Z represents a group selected from the group consisting of:

$$-\underset{\underset{OR^{12}}{|}}{\overset{\overset{OR^{11}}{|}}{P}}, \quad -\underset{\underset{O}{\|}}{\overset{\overset{OR^{13}}{|}}{P}}-OR^{14}, \quad -O-\underset{\underset{O}{\|}}{\overset{\overset{OR^{15}}{|}}{P}}-OR^{16}$$

—$SO_3H$ or a salt thereof, —$OSO_3H$ or a salt thereof, —$CO_2H$ or a salt thereof and —$Si(OR^{17})_{m1}R^{18}{}_{3-m1}$. Z is preferably $$-\underset{\underset{O}{\|}}{\overset{\overset{OR^{13}}{|}}{P}}-OR^{14}, \quad -O-\underset{\underset{O}{\|}}{\overset{\overset{OR^{15}}{|}}{P}}-OR^{16}$$

or —$CO_2H$ or a salt thereof, more preferably $$-O-\underset{\underset{O}{\|}}{\overset{\overset{OR^{15}}{|}}{P}}-OR^{16}$$

or —$CO_2H$ or a salt thereof.

Definition and examples of $R^{11}$, $R^{12}$, $R^{13}$, $R^{14}$, $R^{15}$, $R^{16}$, $R^{17}$, $R^{18}$ and m1 here are the same as in $R^{11}$, $R^{12}$, $R^{13}$, $R^{14}$, $R^{15}$, $R^{16}$, $R^{17}$, $R^{18}$ and m1 described above, respectively. However, $R^{11}$, $R^{12}$, $R^{13}$, $R^{14}$, $R^{15}$, $R^{16}$, $R^{17}$ and $R^{18}$ here independently represent a hydrogen atom or an alkyl group.

Examples of the monomer represented by the formula (5) are described below, but the monomer that can be used in the invention is not limited to those.

A-1 mixture of q = 5 and q = 6

A-2 mixture of q = 4 and q = 5

A-3

A-4

A-5

A-6

A-7

A-8

A-9

A-10

A-11

A-12

A-13

The properties of the thermoplastic resin having a functional group capable of forming a chemical bond with inorganic fine particle that can be used in the invention is almost the same as those of the thermoplastic resin having no functional group capable of forming a chemical bond with inorganic fine particle. The thermoplastic resin having a functional group capable of forming a chemical bond with inorganic fine particle has a refractive index of preferably 1.63 or more, more preferably 1.65 or more, still more preferably 1.68 or more. Those refractive indexes are a value at a wavelength of 589 nm at 22° C.

Examples of the thermoplastic resin having a functional group capable of forming a chemical bond with inorganic fine particle are described below, but the thermoplastic resin having a functional group capable of forming a chemical bond with inorganic fine particle that can be used in the invention is not limited to those.

preferable to use a zirconium oxide fine particle having good transparency in a visible region and low photocatalytic activity.

The inorganic fine particle to be used in the invention may be a hybrid material composed of plural components from the viewpoints of refractive index, transparency, stability and the like. Also, for a variety of purposes of reducing photocatalytic activity, reducing a percentage of water absorption and the like, the inorganic fine particle may be doped with a dissimilar element, or the surface layer of the inorganic fine particle may be coated with a dissimilar metal oxide (for example, silica, alumina) or may be subjected to surface modification with a silane coupling agent, a titanate coupling agent, an aluminate coupling agent, an organic acid (for example, carboxylic

TABLE 1

| No. | Monomer 1 | | Monomer 2 | | Monomer 3 | | Monomer 4 | | Number average molecular weight |
|---|---|---|---|---|---|---|---|---|---|
| | Type | Mass % | Type | Mass % | Type | Mass % | Type | Mass % | |
| P-1 | M-13 | 99.0 | A-4 | 1.0 | | | | | 50k |
| P-2 | M-14 | 99.0 | A-4 | 1.0 | | | | | 80k |
| P-3 | M-26 | 99.0 | A-4 | 1.0 | | | | | 50k |
| P-4 | M-1 | 99.0 | A-4 | 1.0 | | | | | 30k |
| P-5 | M-9 | 99.0 | A-4 | 1.0 | | | | | 60k |
| P-6 | M-10 | 99.0 | A-4 | 1.0 | | | | | 70k |
| P-7 | M-2 | 99.0 | A-4 | 1.0 | | | | | 40k |
| P-8 | M-20 | 99.0 | A-4 | 1.0 | | | | | 50k |
| P-9 | M-21 | 99.0 | A-4 | 1.0 | | | | | 80k |
| P-10 | M-32 | 99.0 | A-4 | 1.0 | | | | | 50k |
| P-11 | M-28 | 99.0 | A-4 | 1.0 | | | | | 60k |
| P-12 | M-13 | 99.0 | A-2 | 1.0 | | | | | 50k |
| P-13 | M-1 | 97.0 | A-11 | 3.0 | | | | | 60k |
| P-14 | M-13 | 99.0 | A-13 | 1.0 | | | | | 50k |
| P-15 | M-13 | 49.0 | M-14 | 49.0 | A-4 | 2.0 | | | 50k |
| P-16 | M-1 | 69.0 | B-1 | 30.0 | A-4 | 1.0 | | | 50k |
| P-17 | M-9 | 79.0 | B-10 | 20.0 | A-4 | 1.0 | | | 80k |
| P-18 | M-13 | 69.0 | B-5 | 30.0 | A-4 | 1.0 | | | 50k |
| P-19 | M-2 | 69.0 | B-1 | 20.0 | B-10 | 10.0 | A-4 | 1.0 | 110k |
| P-20 | M-9 | 59.0 | B-1 | 20.0 | B-10 | 20.0 | A-4 | 1.0 | 60k |
| P-21 | M-13 | 59.0 | B-2 | 39.0 | A-4 | 1.0 | | | 50k |
| P-22 | M-13 | 69.0 | B-9 | 30.0 | A-4 | 1.0 | | | 50k |
| P-23 | M-2 | 69.0 | M-24 | 30.0 | A-4 | 1.0 | | | 40k |
| P-24 | M-34 | 99.0 | A-4 | 1.0 | | | | | 80k |
| P-25 | M-38 | 99.0 | A-4 | 1.0 | | | | | 30k |
| P-26 | M-3 | 99.0 | A-4 | 1.0 | | | | | 70k |
| P-27 | M-13 | 80.0 | B-1 | 19.0 | A-4 | 1.0 | | | 50k |

These resins may be used singly or in admixture of two or more kinds thereof.

[Inorganic Fine Particle]

The inorganic fine particle to be used in the invention is not particularly limited, and fine particles described in, for example, JP-A 2002-241612, JP-A 2005-298717 and JP-A 2006-70069 can be used.

Specifically, oxide fine particles (for example, aluminum oxide, titanium oxide, niobium oxide, zirconium oxide, zinc oxide, magnesium oxide, tellurium oxide, yttrium oxide, indium oxide, tin oxide), composite oxide fine particles (for example, lithium niobate, potassium niobate, lithium tantalate), sulfide fine oxides (for example, zinc sulfide, cadmium sulfide), other semi-conductor crystal fine particles (for example, zinc selenide, cadmium selenide, zinc telluride, cadmium telluride), $LiAlSiO_4$, $PbTiO_3$, $Sc_2W_3O_{12}$, $ZrW_2O_8$, $AlPO_4$, $Nb_2O_5$, $LiNO_3$ and the like can be used.

In particular, of these, metal oxide fine particles are preferable. Above all, any one member selected from the group consisting of zirconium oxide, zinc oxide, tin oxide and titanium oxide is preferable; and any one member selected from the group consisting of zirconium oxide, zinc oxide and titanium oxide is more preferable. Furthermore, it is especially acids, sulfonic acids, phosphoric acids, phosphonic acids) or the like. Furthermore, a combination of two or more types thereof can be employed depending upon the purpose.

In the inorganic fine particle to be used in the invention, its refractive index is not particularly limited. In the case where the material composition of the invention is used for an optical component to be required to have a high refractive index, it is preferable that the inorganic fine particle also has high refractive index properties in addition to the foregoing heat temperature dependency. In that case, the refractive index of the inorganic fine particle to be used is preferably from 1.9 to 3.0, more preferably 2.0 to 2.7, and especially preferably from 2.1 to 2.5 at 22° C. and at a wavelength of 589 nm. When the refractive index of the fine particle is not more than 3.0, since a difference in refractive index from the resin is relatively small, there is a tendency that the Rayleigh scattering is easily inhibited. Also, when the refractive index is 1.9 or more, there is a tendency that an effect for realizing a high refractive index is easily obtained.

The refractive index of the inorganic fine particle can be, for example, estimated by a method of forming a hybrid material hybridized with the thermoplastic resin to be used in the invention into a transparent film, measuring its refractive index by an Abbe's refractometer (for example, "DM-M4", manufactured by Atago Co., Ltd.) and calculating the refractive index of the inorganic fine particle from a refractive index of only the resin component as measured separately, a method of measuring refractive indexes of fine particle dispersions having a different concentration, thereby calculating the refractive index of the inorganic fine particle, or other method.

When the number average particle size of the inorganic fine particle to be used in the invention is too small, there may be the case where the properties inherent to a substance constituting the fine particle vary, whereas when the number average particle size is too large, there may be the case where influences of the Rayleigh scattering become noticeable, thereby extremely lowering the transparency of the material composition. In consequence, a lower limit value of the number average particle size of the inorganic fine particle to be used in the invention is preferably 1 nm or more, more preferably 2 nm or more, and further preferably 3 nm or more; and an upper limit value thereof is preferably not more than 15 nm, more preferably not more than 10 nm, and further preferably not more than 7 nm. That is, the number average particle size of the inorganic fine particle in the invention is preferably from 1 nm to 15 nm, more preferably from 2 nm to 10 nm, and especially preferably from 3 nm to 7 nm.

Also, it is desirable that the inorganic fine particle to be used in the invention is satisfied with the foregoing average particle size and has narrow particle size distribution as far as possible. There are a variety of manners for defining such a monodispersed particle. For example, the numerical value specified range described in JP-A 2006-160992 is also applicable to the preferred particle size distribution range of the fine particle to be used in the invention.

Here, the foregoing number average particle size can be measured by an X-ray diffraction (XRD) analyzer or a transmission electron microscope (TEM) or the like.

The manufacturing method of the inorganic fine particle to be used in the invention is not particularly limited, and any known methods can be employed.

For example, the desired oxide fine particle can be obtained by using a metal halide or a metal alkoxide as a raw material and hydrolyzing it in a reaction system containing water. Details of this method are described in, for example, *Japanese Journal of Applied Physics*, Vol. 37, pages 4603 to 4608 (1998) or *Langmuir*, Vol. 16, No. 1, pages 241 to 246 (2000).

Also, as other methods than the method of hydrolysis in water, a method of preparing an inorganic fine particle in an organic solvent or in an organic solvent having the thermoplastic resin of the invention dissolved therein may be employed. On that occasion, a variety of surface treating agents (for example, silane coupling agents, aluminate coupling agents, titanate coupling agents, organic acids (for example, carboxylic acids, sulfonic acids, phosphonic acids)) may be made coexistent.

Examples of the solvent to be used in these methods include acetone, 2-butanone, dichloromethane, chloroform, toluene, ethyl acetate, cyclohexanone and anisole. These solvents may be used singly or in admixture of plural kinds thereof.

Examples of the synthesis method of the inorganic fine particle include, in addition to the foregoing methods, a variety of general synthesis methods of a fine particle described in, for example, JP-A 2006-70069, including methods for preparing an inorganic fine particle in a vacuum process such as a molecular beam epitaxy method and a CVD method.

From the viewpoints of transparency and realization of a high refractive index, the content of the inorganic fine particle in the transparent article of the invention is preferably from 20 to 95% by mass, more preferably from 25 to 70% by mass, and especially preferably from 30 to 60% by mass. Also, from the standpoint of dispersibility, a mass ratio of the inorganic fine particle to the thermoplastic resin (dispersed polymer) in the invention is preferably from 1/0.01 to 1/100, more preferably from 1/0.05 to 1/10, and especially preferably from 1/0.05 to 1/5.

[Organic-Inorganic Hybrid Composition]

The organic-inorganic hybrid composition of the invention comprises a thermoplastic resin represented by the formula (1) above and inorganic fine particles.

The optical transmission ratio of the organic-inorganic hybrid composition of the invention is preferably 70% or more, more preferably 75% or more, still more preferably 80% or more at a wavelength of 589 nm on a 1-mm thickness basis. Additionally, the optical transmission ratio at a wavelength of 405 nm on a 1-mm thickness basis is preferably 60% or more, more preferably 65% or more, particularly preferably 70% or more. When the optical transmission ratio at a wavelength of 589 nm on a 1-mm thickness basis is 70% or more, a lens material with preferable properties can readily be obtained. The optical transmission ratio on a 1-mm thickness basis in accordance with the invention is a value obtained by molding an organic-inorganic hybrid composition to prepare a substrate of a thickness of 1 mm and then measuring the transmission ratio with a UV-ultraviolet absorption spectrometer (UV-3100 manufactured by Shimadzu Corporation).

The refractive index of the organic-inorganic hybrid composition of the invention is preferably 1.60 or more, more preferably 1.63 or more, further more preferably 1.65 or more, still more preferably 1.67 or more and particularly preferably 1.70 or more, at a wavelength of 589 nm.

The organic-inorganic hybrid composition of the invention comprises a resin and inorganic fine particles as essential components and may comprise other components including other types of resins and additives such as dispersants, plasticizers, releasing agents and antistatic agents.

For the purpose of preventing the deposition of dusts to the obtained article, it is desirable that the organic-inorganic hybrid composition of the invention is hardly electrified. Its dielectric strength is preferably from −2 to 15 kV, more preferably from −1.5 to 7.5 kV, and especially preferably from −1.0 to 7.0 kV. In order to adjust the dielectric strength of the organic-inorganic hybrid composition of the invention, an antistatic agent can be added. In the organic-inorganic hybrid composition of the invention, there may be the case where the inorganic fine particle per se, which is added for the purpose of improving the optical properties, contributes to an antistatic effect as a separate effect. In the case where the antistatic agent is added, examples thereof include an anionic antistatic agent, a cationic antistatic agent, a nonionic antistatic agent, an ampholytic antistatic agent, a polymer antistatic agent and an antistatic fine particle. Such an antistatic agent may be used in combination of two or more kinds thereof. Examples thereof include compounds described in JP-A 2007-4131 and JP-A 2003-201396.

Though the addition amount of the antistatic agent is divergent, it is preferably from 0.001 to 50% by mass, more preferably from 0.01 to 30% by mass, and especially preferably from 0.1 to 10% by mass of the total solids content.

The glass transition temperature of the organic-inorganic hybrid composition of the invention is preferably 100° C. to 400° C., more preferably 130° C. to 380° C. When the glass transition temperature is 100° C. or more, sufficient thermal resistance can readily be obtained. When the glass transition temperature is 400° C. or less, the organic-inorganic hybrid composition is likely to be molded readily.

In the organic-inorganic hybrid composition of the invention, it is preferable that when kept at 200° C. for 2 hours, its volatile component content is not more than 2% by mass; it is more preferable that when kept at 230° C. for 2 hours, its volatile component content is not more than 2% by mass; and it is especially preferable that when kept at 250° C. for 2 hours, its volatile component content is not more than 2% by mass.

In the organic-inorganic hybrid composition of the invention, its percentage of saturated water absorption is preferably not more than 2% by mass, more preferably not more than 1% by mass, and especially preferably not more than 0.5% by mass.

[Other Additives]

Other than the thermoplastic resin and the inorganic fine particles, various additives may appropriately be blended in the organic-inorganic hybrid composition of the invention in view of the adjustment of uniform dispersibility, releasability during molding and weatherability.

The ratio of these blended additives varies depending on the purpose. To the total amount of the inorganic fine particles and the thermoplastic resin, the ratio is preferably 0 to 50% by mass, more preferably 0 to 30% by mass and particularly preferably 0 to 20% by mass.

(Surface-Treating Agents)

In accordance with the invention, agents for modifying the surface of the inorganic fine particles except the thermoplastic resin may be added in mixing the inorganic fine particles dispersed in water or an alcohol solvent with the thermoplastic resin, as described below, for various purposes such as for the purpose of raising the extractability or substitution property in an organic solvent, the purpose of raising the uniform dispersibility in the thermoplastic resin, the purpose of reducing the water absorption of the fine particles, or the purpose of raising the weatherability. The weight average molecular weight of the surface-treating agent is preferably 50 to 50,000, more preferably 100 to 20,000, still more preferably 200 to 10,000.

The surface-treating agent is preferably in the structure represented by the following formula (6).

$$A-B \qquad \text{Formula (6)}$$

In the formula (6), A represents a functional group capable of forming a chemical bond with the surface of the inorganic fine particles for use in accordance with the invention; and B represents a monovalent group with one to 30 carbon atoms or a polymer, having compatibility or reactivity with the resin matrix comprising the thermoplastic resin as the main component. Herein, the term chemical bond means for example covalent bonds, ionic bonds, coordination bonds and hydrogen bonds.

Specific examples of A in coordination with the inorganic fine particles include sulfur-containing organic compounds such as thiol and sulfonates, phosphorus-containing organic ligands including phosphine and phosphine oxide, phosphonic acid and phosphate esters, nitrogen-containing ligands containing alkyl amine and aromatic amine, and ligands containing carboxylates are effective. Among those exemplified above, phosphorus-containing ligands are preferably used and preferably include for example KAYAMER PM-21 manufactured by Nippon Kayaku Co., Ltd. and dibenzyl phosphate, and diphenyl phosphate. As specific examples of A for modification via covalent bond, metal alkoxides as the active functional groups in silane-coupling agents, titanate-series coupling agents and aluminium-series coupling agents for use in the related art for oxide surface treatment, such as silica, alumina and titania (titanium oxide), are effective. Among them, silane-coupling agents are preferable, for which methods described in JP-A 5-221640, JP-A 9-100111, and JP-A 2002-187921 may be used. Furthermore, preferable examples of the group represented by A are those listed as the functional groups for the thermoplastic resin for use in accordance with the invention.

Alternatively, the chemical structure of the group represented by B is preferably the same as or similar to the chemical structure of the thermoplastic resin as the main body of the resin matrix, from the standpoint of compatibility. In accordance with the invention, preferably, the chemical structure of B as well as the thermoplastic resin may contain an aromatic ring, so as to allow a large refractive index.

Examples of the surface-treating agent for use preferably in accordance with the invention include p-octylbenzoic acid, p-propylbenzoic acid, acetic acid, propionic acid, cyclopentanecarboxylic acid, dibenzyl phosphate, monobenzyl phosphate, diphenyl phosphate, di-α-naphthyl phosphate, phenylphosphonic acid, phenylphosphonate monophenyl ester, KAYAMER PM-21 (under trade name; manufactured by Nippon Kayaku Co., Ltd.), KAYAMER PM-2 (under trade name; manufactured by Nippon Kayaku Co., Ltd), benzenesulfonic acid, naphthalenesulfonic acid, p-octylbenzenesulfonic acid, or silane coupling agents described in JP-A 5-221640, JP-A 9-100111, and JP-A 2002-187921, with no specific limitation.

These surface-treating agents may be used singly as one type or plural types thereof may be used in combination.

The total amount of these surface-treating agents added is preferably 0.01- to 2-fold, more preferably 0.03- to one-fold, particularly preferably 0.05- to 0.5-fold that of the inorganic fine particles.

(Other Additives)

In addition to the compounds mentioned in the above, other various additives may be added to the composition for the purpose of enhancing the mold-releasing effect and enhancing the flowability during molding. The additives include natural waxes, for example, vegetable waxes such as carnauba wax, rice wax, cotton wax, Japan tallow, etc.; animal waxes such as bees wax, lanolin, etc.; mineral waxes such as ozokerite, ceresin, etc.; petroleum waxes such as paraffin, microcrystalline wax, petrolatum, etc.; as well as synthetic waxes, for example, synthetic hydrocarbon waxes such as Fischer-Tropsch wax, polyethylene wax, etc.; long-chain aliphatic amides such as stearic acid amide, chlorohydrocarbons, etc.; esters, ketones, ethers, etc; and also silicone oils such as dimethylsilicone oil, methylphenylsilicone oil, etc.; fluorotelomers such as DuPont's Zonyl FSN, Zonyl FOS, etc. In addition, for the purpose of enhancing the lightfastness and the thermal resistance of the composition, any known antioxidant of hindered phenol compounds, amine compounds, phosphorus-containing compounds and thioether compounds may be suitably added thereto. The amount of the antioxidant, if any, is preferably from 0.1 to 5% by mass of the total solid content of the resin composition.

[Manufacturing Method of Organic-Inorganic Hybrid Composition]

The inorganic fine particle to be used in the invention is bound with the thermoplastic resin having the foregoing functional group and dispersed in the resin.

Since the inorganic fine particle to be used in the invention is small in particle size and high in surface energy, when isolated as a solid, it is difficult to be re-dispersed. Therefore, it is preferable that the inorganic fine particle is mixed with the foregoing thermoplastic resin in a dispersed state in a solution to form a stable dispersion. Preferred examples of the manufacturing method of the hybrid material include (1) a method in which an inorganic fine particle is surface treated in the presence of the foregoing surface treating agent, the surface-treated inorganic fine particle is extracted into an organic solvent, and the extracted inorganic fine particle is uniformly mixed with the foregoing thermoplastic resin to manufacture a hybrid material of the inorganic fine particle and the thermoplastic resin; and (2) a method in which inorganic fine particles, a thermoplastic resin and other additives are uniformly mixed using a solvent capable of uniformly dispersing or dissolving all the components therein to manufacture a hybrid material of the inorganic fine particle and the thermoplastic resin.

In the case where a hybrid material of the inorganic fine particle and the thermoplastic resin is manufactured by the foregoing method (1), a water-insoluble solvent such as toluene, ethyl acetate, methyl isobutyl ketone, chloroform, dichloroethane, dichloromethane, chlorobenzene and methoxybenzene is used as the organic solvent. Though the surface treating agent to be used for extracting the inorganic fine particle into the organic solvent and the thermoplastic resin may be the same kind or a different kind, as to the surface treating agent to be preferably used, those described above in the (Surface-treating agent) section are exemplified.

In mixing the inorganic fine particle extracted into the organic solvent and the thermoplastic resin, additives such as a plasticizer, a releasing agent and a polymer of other type may be added as the need arises.

In the case where the foregoing method (2) is employed, a single or mixed solvent of hydrophilic polar solvents (for example, dimethylacetamide, dimethylformamide, dimethyl sulfoxide, benzyl alcohol, cyclohexanol, ethylene glycol monomethyl ether, 1-methoxy-2-propanol, tert-butanol, acetic acid, propionic acid) is preferably used as the solvent. Alternatively, a mixed solvent of a water-insoluble resin (for example, chloroform, dichloroethane, dichloromethane, ethyl acetate, methyl ethyl ketone, methyl isobutyl ketone, toluene, chlorobenzene, methoxybenzene) and the foregoing polar solvent is preferably used as the solvent. On that occasion, apart from the foregoing thermoplastic resin, a dispersant, a plasticizer, a releasing agent or a polymer of other type may be added as the need arises. In using a fine particle dispersed in water/methanol, it is preferable that after adding a hydrophilic solvent capable of dissolving the thermoplastic resin therein at a higher boiling point than that of water/methanol, the water/methanol is concentrated and distilled off, thereby substituting a dispersion of the fine particle into the polar organic solvent, followed by mixing with the resin. On that occasion, the foregoing surface treating agent may be added.

The solution of the material composition obtained in the foregoing method (1) or (2) can be subjected to cast molding as it is, to obtain a transparent shaped article. However, in the invention, it is especially preferable that after removing the solvent from the solution by a method such as concentration, freeze-drying and reprecipitation from an appropriate poor solvent, a powdered solid is molded by a known method such as injection molding and compression molding. In this case, the powdery organic-inorganic hybrid composition of the invention can be directly heated to molten or compressed to form a shaped article such as lens. Preferably, the powdery organic-inorganic hybrid composition of the invention is formed into a preform (precursor) having a predetermined weight and a predetermined shape according to a method of directly melting it under heat followed by extrusion or the like, and the resulting preform is deformed through compression molding into an optical article such as a lens or the like. In this case, for efficiently forming the product having a desired shape, the preform may be made to have a suitable curvature.

[Shaped Articles]

By molding the organic-inorganic hybrid composition of the invention described above, the shaped article of the invention can be produced. The shaped article of the invention has the refractive index and the optical properties as described in the column about the organic-inorganic hybrid composition, and is therefore useful. The shaped articles of the invention having a maximum thickness of 0.1 mm or more is particularly useful as an optical part with a high refractive index. The maximum thickness is preferably 0.1 to 5 mm, more preferably 1 to 3 mm.

Shaped articles of such thickness are generally produced, with much difficulty, by solution cast methods, because the solvent therein can hardly be drawn out. When the organic-inorganic hybrid composition of the invention is used, however, molding is readily done to readily prepare complicated shapes such as non-spherical shapes. As described above, in accordance with the invention, shaped articles with good transparency can be obtained, using the large refractive index properties of the fine particles.

EXAMPLES

The characteristic features of the invention are more specifically described in the following Examples. The materials, the amounts of the materials used, the ratios thereof, the contents of the treatment, and the procedures for the treatment may be modified appropriately. Therefore, the scope of the invention should never be understood as limiting to the following specific examples.

Example 1 to 10 and Comparative Examples 1 to 4

Methods for Analysis and Evaluation (1) Observation with Transmission Electron Microscope (TEM)

A transmission electron microscope of type H-9000 UHR as manufactured by Hitachi Co., Ltd. (at an acceleration voltage of 200 kV and a vacuum level of about $7.6 \times 10^{-9}$ Pa under observation) was used.

(2) Measurement of Optical Transmission Ratio

A sample to be measured was molded into a substrate of a thickness of 1.0 mm. The optical transmission ratio thereof was measured at a wavelength of 589 nm, using an ultraviolet-visible absorption spectrometer UV-3100 (manufactured by Shimadzu Corporation).

(3) Measurement of Refractive Index

Refractive index was measured at a wavelength of 589 nm, using Abbe refractometer (DR-M4 manufactured by Atago Co., Ltd.).

(4) X-Ray Diffraction (XRD) Spectroscopy

The spectrum was measured at 23° C., using RINT 1500 (X-ray source: copper Kα; a wavelength of 1.5418 angstroms) manufactured by Rigaku Corporation.

(5) Molecular Weight Analysis

The number average molecular weight and the weight average molecular weight are molecular weights in terms of polystyrene conversion by detection with a differential refractometer (solvent: tetrahydrofuran) using GPC analyzer using columns of TSK gel GMHxL, TSK gel G4000HxL and TSK gel G2000HxL (all are the trade names of products manufactured by Tosoh Corporation).

Production of Organic-Inorganic Hybrid Compositions (1) Preparation of Titanium Oxide Fine Particles According to the method described in the Synthetic Example 9 in the official gazette of JP-A 2003-73559, titanium oxide fine particles were prepared synthetically. The generation of titanium oxide fine particles of the anatase type (the number average particle size was about 5 nm) was verified by XRD and TEM. The refraction index of the produced fine particles was 2.1.

(2) Preparation of Zirconium Oxide Fine Particles

A zirconium oxychloride solution at a concentration of 50 g/L was neutralized with an aqueous 48% sodium hydroxide solution, to obtain a suspension of hydrated zirconium. After the suspension was filtered and rinsed in ion exchange water, a hydrated zirconium cake was obtained. The cake was adjusted to a concentration of 15% by mass on a zirconium oxide basis, using ion exchange water as a solvent. The resulting cake was placed in an autoclave, for treatment in water and under heating at a pressure of 150 atm and 150° C. for 24 hours, to prepare a suspension of zirconium oxide fine particles. It was verified by TEM that zirconium oxide fine particles of a number average particle size of 5 nm was generated. The refraction index of the produced fine particles was 2.1.

(3) Preparation of a Dispersion of Zirconium Oxide Fine Particles in Toluene

After mixing the suspension of the zirconium oxide as synthetically prepared above in (2) with a solution of KAYAMER PM-21 (manufactured by Nippon Kayaku Co., Ltd.) dissolved in toluene, the resulting mixture was agitated at 50° C. for 8 hours. The toluene solution was extracted and washed in water, to obtain a dispersion of the zirconium oxide fine particles in toluene.

(4) Preparation of a Dispersion of Zirconium Oxide in Dimethylacetamide 500 g of N,N'-dimethylacetamide was added to 500 g of the suspension of zirconium oxide (aqueous dispersion at 15% by mass) as prepared above in (2), for concentration under reduced pressure until the mixture was around 500 g or less, for solvent substitution. Then, the concentration was adjusted by adding N,N'-dimethylacetamide, to obtain the dispersion (2) of zirconium oxide in dimethylacetamide at 15% by mass.

[Production of Thermoplastic Resin]
Production of Thermoplastic Resin (P-1):

2-(2-benzothiazolyl)phenyl methacrylate (M-13) (99.0 g), β-carboxyethyl acrylate (A-4) (1.0 g) and a polymerization initiator (Wako Pure Chemical's trade name V-601) (0.10 g) were dissolved in ethyl acetate (100 g), and polymerized in nitrogen at 80° C. to give a thermoplastic resin (P-1). As measured through GPC, the number-average molecular weight of the resin was 50,000, the weight-average molecular weight thereof was 122,000. As measured with an Abbe's refractiometer, the refractive index of the resin was 1.69.

The other polymers exemplified herein can also be produced in the same manner as above.

Preparation of Resin Composition and Production of Transparent Shaped Article (Lens Substrate)

Example 1

The thermoplastic resin (P-1) and a surface-treating agent (4-propylbenzoic acid: 4C3BA) were added to the above-mentioned, zirconium oxide/dimethylacetamide dispersion in a ratio by mass of $ZrO_2$ (solid content)/P-1/4C3BA=40.0/52.0/8.0, and uniformly stirred and mixed, and the resulting mixture was concentrated under reduced pressure to remove the dimethylacetamide solvent. The concentrated residue was molded in a mold having a SUS-made surface in a mode of thermal compression molding therein (temperature, 190° C.; pressure, 13.7 MPa; time, 2 minutes) to give a transparent shaped articles (lens substrate) having a thickness of 1 mm.

The light transmittance and the refractive index of the shaped article are shown in Table 2.

Examples 2 to 9, and Comparative Examples 1 to 4

Shaped articles of Examples 2 to 9 and Comparative Examples 1 and 2 were produced in the same manner as in Example 1, for which, however, the ratio of the $ZrO_2$ solid content, the thermoplastic resin and 4C3BA in Example 1 was changed as in Table 1.

In Comparative Examples 3 and 4, the resin alone was shaped, not adding inorganic particles thereto.

The light transmittance and the refractive index of the shaped articles thus produced in the above are shown in Table 2.

Example 10

The above-mentioned titanium oxide dispersion was dropwise added to a chloroform solution of the thermoplastic resin P-5 and the surface-treating agent 4C3BA at room temperature, taking 5 minutes, and then the solvent was evaporated away ($TiO_2$ solid content/P-5/4C3BA=35/58/7). The concentrated residue was shaped in the same manner as in Example 1 to give a transparent shaped article (lens substrate) of Example 10.

The light transmittance and the refractive index of the shaped article thus produced in the above are shown in Table 2.

TABLE 2

| Sample | Thermoplastic resin Type | Mass % | Inorganic fine particle Type | Mass % | Surface-treating agent Type | Mass % | Transmittance (%) | Refractive index |
|---|---|---|---|---|---|---|---|---|
| Example 1 | P-1 | 52.0 | $ZrO_2$ | 40.0 | 4-C3BA | 8.0 | 82 | 1.72 |
| Example 2 | P-1 | 64.0 | $ZrO_2$ | 30.0 | 4-C3BA | 6.0 | 83 | 1.71 |
| Example 3 | P-4 | 70.0 | $ZrO_2$ | 25.0 | 4-C3BA | 5.0 | 83 | 1.70 |
| Example 4 | P-5 | 52.0 | $ZrO_2$ | 40.0 | 4-C3BA | 8.0 | 81 | 1.73 |
| Example 5 | P-7 | 64.0 | $ZrO_2$ | 30.0 | 4-C3BA | 6.0 | 84 | 1.70 |
| Example 6 | P-19 | 64.0 | $ZrO_2$ | 30.0 | 4-C3BA | 6.0 | 84 | 1.67 |
| Example 7 | P-20 | 64.0 | $ZrO_2$ | 30.0 | 4-C3BA | 6.0 | 85 | 1.66 |
| Example 8 | P-22 | 52.0 | $ZrO_2$ | 40.0 | 4-C3BA | 8.0 | 85 | 1.68 |

TABLE 2-continued

| Sample | Thermoplastic resin Type | Thermoplastic resin Mass % | Inorganic fine particle Type | Inorganic fine particle Mass % | Surface-treating agent Type | Surface-treating agent Mass % | Transmittance (%) | Refractive index |
|---|---|---|---|---|---|---|---|---|
| Example 9 | P-3 | 64.0 | ZrO$_2$ | 30.0 | 4-C3BA | 6.0 | 86 | 1.64 |
| Example 10 | P-5 | 58.0 | TiO$_2$ | 35.0 | 4-C3BA | 7.0 | 80 | 1.76 |
| Comparative Example 1 | PS *1) | 64.0 | ZrO$_2$ | 30.0 | 4-C3BA | 6.0 | 0 | unmeasurable |
| Comparative Example 2 | PC *2) | 64.0 | ZrO$_2$ | 30.0 | 4-C3BA | 6.0 | 0 | unmeasurable |
| Comparative Example 3 | PS *1) | 100.0 | | | | | 88 | 1.59 |
| Comparative Example 4 | PC *2) | 100.0 | | | | | 88 | 1.58 |

*1) PSt: Polystyrene manufactured by Aldrich, Product No. 182427, weight average molecular weight 280,000
*2) PC: Polycarbonate manufactured by Aldrich, Product No. 181625, weight average molecular weight 64,000

As is obvious from Table 2, optical parts having a large refractive index and having good transparency were produced according to the invention (Examples 1 to 10). In Comparative Examples 1 and 2, the samples were cloudy, and could not be transparent shaped articles. In Comparative Examples 3 and 4, the samples were inferior to those in Examples in point of the refractivity thereof.

In addition, Table 2 confirms that the resin composition of the invention mainly comprising a thermoplastic resin can be shaped into lenses with good producibility and exactly in accordance with the shape of a concave lens, a convex lens or the like of the mold used.

Example 11 to 20 and Comparative Example 11

Methods for Analysis and Evaluation (1) Measurement of Number Average Molecular Weight Number average molecular weight here is a molecular weight in terms of polystyrene conversion by detection with a differential refractometer (solvent: tetrahydrofuran) using GPC analyzer using columns of TSK gel GMHxL, TSK gel G4000HxL and TSK gel G2000HxL (all are the trade names of products manufactured by Tosoh Corporation).

(2) Measurement of Glass Transition Temperature (Tg)

Using a differential scanning calorimeter (DSC6200, by Seiko Instruments), Tg of each sample was measured in nitrogen under a heating condition of 10° C./min.

(3) Measurement of Refractive Index

Refractive index was measured at a wavelength of 589 nm and at 23° C., using Abbe refractometer (DR-M4 manufactured by Atago Co., Ltd.).

(4) Measurement of Optical Transmission Ratio

The optical transmission ratio thereof was measured at a wavelength each of 405 nm and 589 nm, using an ultraviolet-visible absorption spectrometer UV-3100 (manufactured by Shimadzu Corporation).

Production of Material

Production of Monomer M-13:

2-(2-Hydroxyphenyl)benzothiazole (15.0 g, 66.0 mmol) and triethylamine (8.4 g, 83 mmol) were dissolved in ethyl acetate (100 ml), and methacrylic acid chloride (8.3 g, 79 mmol) was dropwise added thereto at an inner temperature of not higher than 5° C. After the addition, this was reacted at room temperature for further 3 hours, and then water (5 ml) was added thereto to stop the reaction. This was extracted with ethyl acetate, washed with water and concentrated to dryness to give a solid. The solid was recrystallized from methanol to give a white powder of M-13 (yield, 70%).

The other monomers used in Examples were produced in the same manner as above.

Production of Resin PP-1:

M-13 (5.0 g) was dissolved in ethyl acetate (5.0 g), and an azo-type initiator (Wako Pure Chemical's trade name V-601) (5.0 mg) was added thereto. The reaction system was purged with nitrogen, and then reacted at an oil bath temperature of 80° C. for 6 hours for solidification. The solid was boiled and washed with a large quantity of ethyl acetate, then filtered and dried to give a resin PP-1. The number-average molecular weight of the resin PP-1 was 50,000, the weight-average molecular weight thereof was 132,000, and the glass transition temperature thereof was 146° C.

The other resins used in Examples were produced in the same manner as above.

Production of Optical Parts by Thermal Shaping

The number-average molecular weight and the glass transition temperature of the resins shown in Table 3 were measured according to the above-mentioned methods, and the results are shown in Table 3. Next, the resin powder was put into a hot mold, and compression-molded therein under a pressure of 1 ton to give a shaped article for lens having a diameter of 8 mm and a thickness of 1 mm. In case where the melt viscosity of the resin is low, the resin may be melt-shaped. Briefly, the resin powder is put into a test tube having an outer diameter of 20 mm, melted under heat and then cooled to give a shaped article for lens. The temperature in molding is shown in Table 3. The shaped article was cut and polished, and its refractive index and light transmittance were measured. The results are shown in Table 3 below. Next, the shaped article for lens was worked into a lens, thereby giving an optical part, lens.

TABLE 3

| Resin | Number average molecular weight | Tg (°C.) | Refractive index | Transmittance (%) 405 nm | Transmittance (%) 589 nm | Forming temperature (°C.) |
|---|---|---|---|---|---|---|
| Example 11 | PP-1 | 50,000 | 146 | 1.69 | 82 | 86 | 190 |
| Example 12 | PP-2 | 60,000 | 112 | 1.69 | 82 | 86 | 150 |
| Example 13 | PP-3 | 35,000 | 115 | 1.69 | 77 | 85 | 155 |
| Example 14 | PP-4 | 30,000 | 198 | 1.68 | 75 | 85 | 240 |
| Example 15 | PP-7 | 40,000 | 110 | 1.66 | 78 | 87 | 190 |
| Example 16 | PP-9 | 40,000 | 120 | 1.67 | 73 | 85 | 170 |
| Example 17 | PP-10 | 50,000 | 120 | 1.70 | 72 | 83 | 170 |
| Example 18 | PP-11 | 70,000 | 110 | 1.66 | 75 | 85 | 150 |
| Example 19 | PP-19 | 50,000 | 160 | 1.64 | 80 | 87 | 210 |
| Example 20 | PP-23 | 60,000 | 145 | 1.63 | 76 | 87 | 190 |
| Comparative Example 11 | Q-1 | 40,000 | 65 | 1.70 | 58 | 75 | 110 |

Resin Q-1 used in Comparative Example 11 has the following structural unit, that is disclosed in JP-A 2-20401.

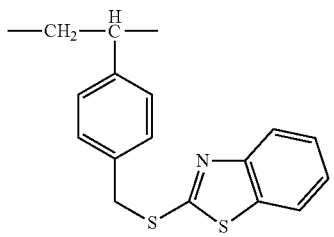

Q-1

As is obvious from Table 3, optical parts having high refractivity, heat resistance and transparency and colored little were obtained according to the invention (Examples 11 to 20). In addition, the workability of the samples of these Examples was extremely good. On the other hand, the sample in Comparative Example 11 had a high refractive index, but its heat resistance was insufficient, and therefore, the thermoformed sample was yellowed and its transmittance at 405 nm was low.

INDUSTRIAL APPLICABILITY

The organic-inorganic hybrid composition of the invention has excellent transparency and high refractivity. According to the invention, the refractive index of the composition can be controlled in any desired manner. Further, the organic-inorganic hybrid composition of the invention can readily provide optical parts having good mechanical strength, heat resistance, weather resistance and shapability. Accordingly, the industrial applicability of the invention is great.

The invention claimed is:

1. A thermoplastic resin having a recurring unit represented by the following formula (3):

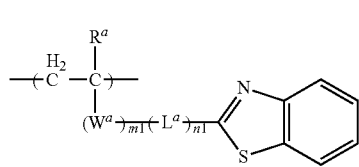

Formula (3)

wherein $R^a$ represents a hydrogen atom, an alkyl group, or an aryl group; $W^a$ represents a linking group selected from —C(=O)O—, —C(=O)—, —OC(=O)—, —OC(=O)O—, and —O—; $L^a$ is selected from the group consisting of -arylene-, -arylene-C(=O)O—, -arylene-C(=O)O-arylene-, —(CH$_2$)$_p$—O—, -arylene-(CH$_2$)$_p$—, -arylene-(CH$_2$)$_p$—O—, -arylene-(CH$_2$)$_p$—O-arylene-, —(CH$_2$)$_p$-arylene-, —(CH$_2$)$_p$-arylene-O—, and —(CH$_2$)$_p$-arylene-O-arylene-; wherein p is an integer of from 1 to 4, provided that the end of the linking group $L^a$ on the $W^a$ side is neither —O— nor —C(=O)—; m1 and n1 each independently indicate 0 or 1, and m1+n1 is 1 or 2.

2. The thermoplastic resin according to claim 1, which has a glass transition temperature of not lower than 90° C.

3. The thermoplastic resin according to claim 1, wherein $L^a$ is selected from the group consisting of -arylene-, -arylene-C(=O)O-arylene-, —(CH$_2$)$_p$—O—, -arylene-(CH$_2$)$_p$—O—, -arylene-(CH$_2$)$_p$—O-arylene-, and —(CH$_2$)$_p$-arylene-; wherein p is an integer of from 1 to 4.

4. The thermoplastic resin according to claim 1, which also has a recurring unit derived from a monomer selected from the group consisting of styrene derivatives, 1-vinylnaphthalene, 2-vinylnaphthalene, vinylcarbazol, acrylic acids, methacrylic acids, acrylate esters, methacrylate esters, and acrylonitorile.

5. The thermoplastic resin according to claim 1, wherein the ratio of the monomer capable of forming the recurring unit represented by the formula (3) relative to all the monomers is 10 to 100% by weight.

6. The thermoplastic resin according to claim 1, wherein the recurring unit is derived from a monomer selected from the group consisting of the following monomers:

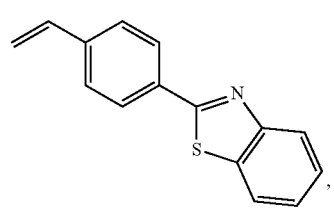

M-9

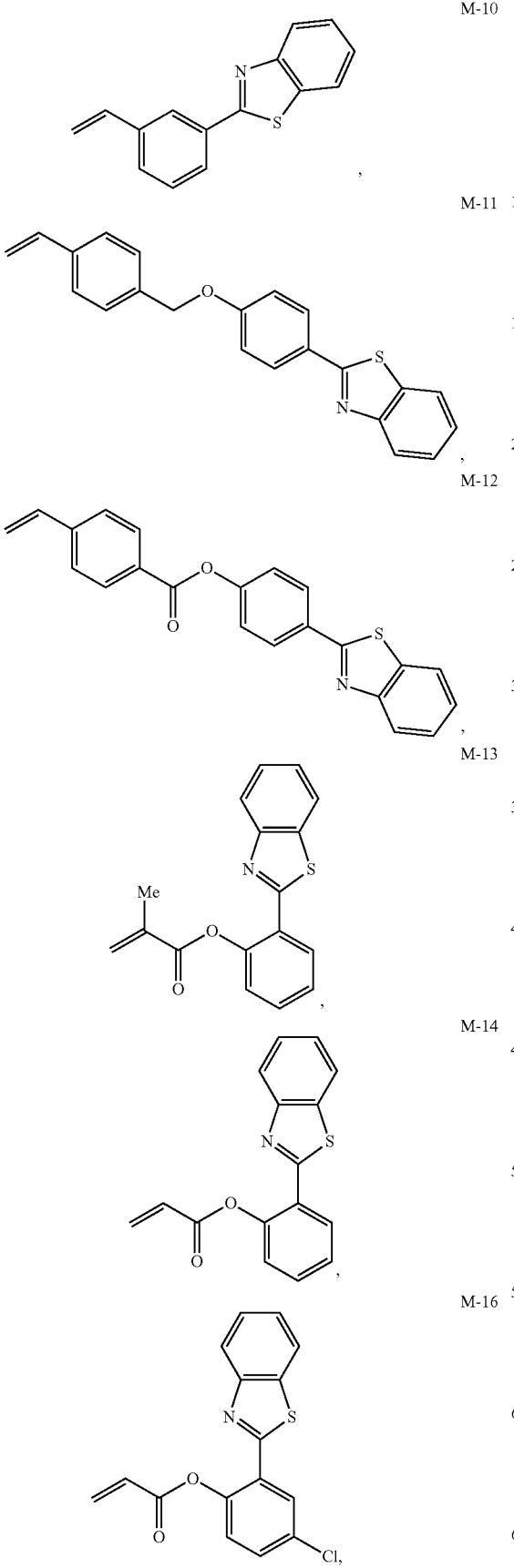
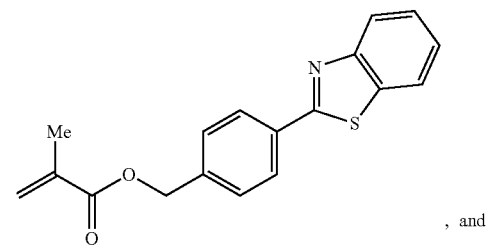

M-24
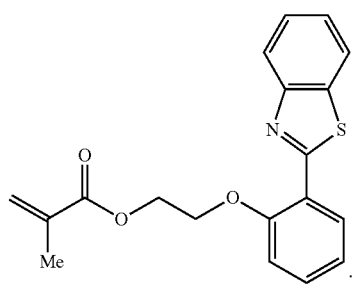
7. The thermoplastic resin according to claim 1, which is represented by one of the following formulae:
PP-1
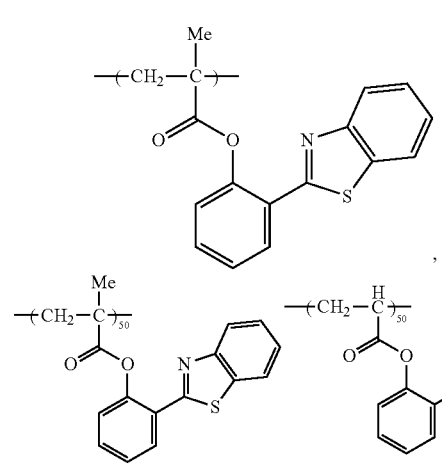
PP-8
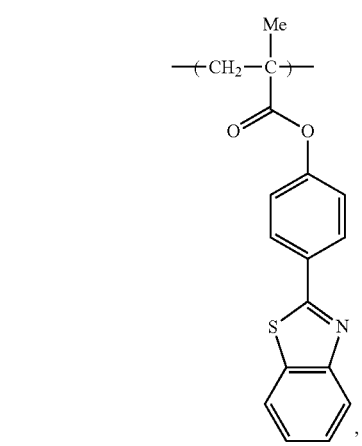
PP-10
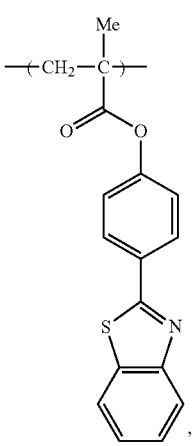
PP-11
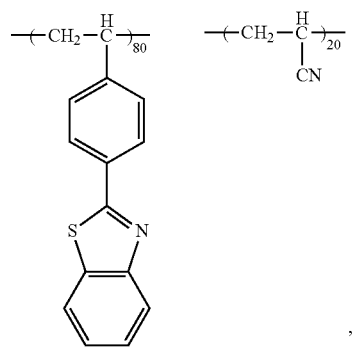
PP-12
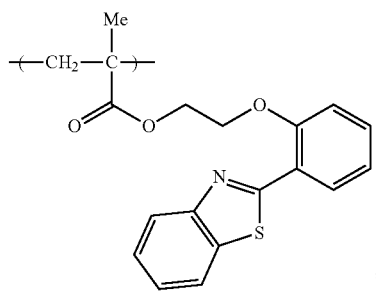
PP-17
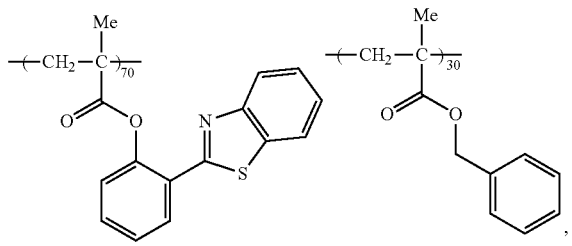
PP-18

-continued
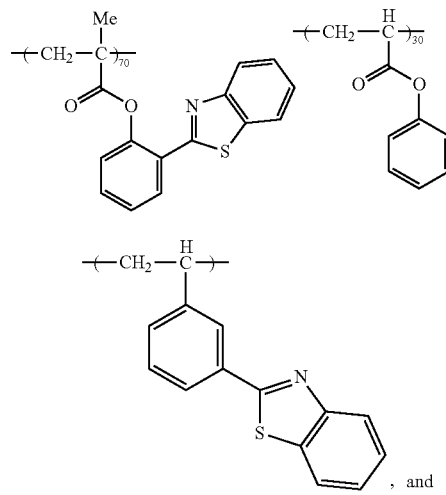
, and
-continued
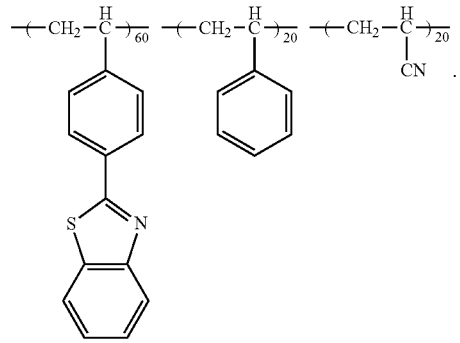
8. The thermoplastic resin according to claim 1, wherein $L^a$ is a linking group selected from the group consisting of -arylene-, -arylene-C(=O)O—, -arylene-C(=O)O-arylene-, —(CH$_2$)$_p$—O—, -arylene-(CH$_2$)$_p$—, -arylene-(CH$_2$)$_p$—O—, -arylene-(CH$_2$)$_p$—O-arylene-, —(CH$_2$)$_p$-arylene-, —(CH$_2$)$_p$-arylene-O—, and —(CH$_2$)$_p$-arylene-O-arylene-; wherein p is an integer of 1 or 2.
* * * * *